(12) United States Patent
Aloisio et al.

(10) Patent No.: US 11,122,079 B1
(45) Date of Patent: *Sep. 14, 2021

(54) OBFUSCATION FOR HIGH-PERFORMANCE COMPUTING SYSTEMS

(71) Applicant: Architecture Technology Corporation, Minneapolis, MN (US)

(72) Inventors: Scott Aloisio, Willseyville, NY (US); Robert A. Joyce, Ithaca, NY (US); Paul Nicotera, Ithaca, NY (US); Matthew A. Stillerman, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/377,971

(22) Filed: Apr. 8, 2019

(51) Int. Cl.
*G06F 11/00* (2006.01)
*H04L 29/06* (2006.01)
*G06F 21/14* (2013.01)
*G06F 21/62* (2013.01)
*G06F 12/14* (2006.01)

(52) U.S. Cl.
CPC .......... *H04L 63/1491* (2013.01); *G06F 21/14* (2013.01); *G06F 21/6218* (2013.01); *H04L 63/1425* (2013.01); *H04L 63/1475* (2013.01)

(58) Field of Classification Search
CPC ........ G06F 21/52; G06F 21/60; G06F 21/602; G06F 21/6254; G06F 2221/2107; G06F 21/14; H04L 9/12; H04L 9/008; H04L 9/0894

See application file for complete search history.

(56) References Cited

U.S. PATENT DOCUMENTS 10,127,238 B1 11/2018 Bent et al.
10,263,968 B1 * 4/2019 Ashminov ............ H04L 9/0656
10,299,114 B1 5/2019 Stevens et al.
(Continued)

OTHER PUBLICATIONS

Yoo et al., "SLURM: Simple Linux Utility for Resource Management", pp. 44-60, Lawrence Livermore National Laboratory, JSSPP 2003, Jun. 24, 2003, 17 pp.
(Continued)

*Primary Examiner* — Gary S Gracia
(74) *Attorney, Agent, or Firm* — Shumaker & Sieffert, P.A.

(57) ABSTRACT

An example technique includes initializing, by an obfuscation computing system, communications with nodes in a distributed computing platform. The nodes include compute nodes that provide resources in the distributed computing platform and a controller node that performs resource management of the resources. The obfuscation computing system serves as an intermediary between the controller node and the compute nodes. The technique further includes outputting an interactive user interface (UI) providing a selection between a first privilege level and a second privilege level, and performing one of: based on the selection being for the first privilege level, a first obfuscation mechanism for the distributed computing platform to obfuscate digital traffic between a user computing system and the nodes, or based on the selection being for the second
(Continued)

privilege level, a second obfuscation mechanism for the distributed computing platform to obfuscate digital traffic between the user computing system and the nodes.

20 Claims, 7 Drawing Sheets

(56) References Cited

U.S. PATENT DOCUMENTS

| | | | | |
|---|---|---|---|---|
| 10,452,821 | B2* | 10/2019 | Hook | G06F 21/84 |
| 10,621,365 | B1* | 4/2020 | Powers | H04L 9/0894 |
| 2005/0050344 | A1* | 3/2005 | Hull | H04L 9/0825 |
| | | | | 713/193 |
| 2014/0122866 | A1* | 5/2014 | Haeger | H04L 63/061 |
| | | | | 713/153 |
| 2015/0207626 | A1 | 7/2015 | Neftel et al. | |
| 2015/0288777 | A1 | 10/2015 | Yalozo et al. | |
| 2016/0092871 | A1* | 3/2016 | Gordon | H04W 4/06 |
| | | | | 705/44 |
| 2017/0286650 | A1* | 10/2017 | Hook | G06F 21/57 |
| 2017/0339216 | A1* | 11/2017 | Carlos | H04L 67/06 |
| 2018/0211062 | A1* | 7/2018 | Holland | G06F 21/6254 |
| 2018/0285592 | A1* | 10/2018 | Sharifi | G06F 21/84 |
| 2020/0026876 | A1* | 1/2020 | Garg | G06F 21/604 |

OTHER PUBLICATIONS

Wikipedia, Slurm Workload Manager, Retrieved on Mar. 2, 2017 from http://en.wikipedia.org/wiki/Slurm_Workload_Manager, Last modified Feb. 10, 2017, 4 pgs.
Wikipedia, Slurm Workload Manager, Retrieved on Jan. 13, 2020 from http://en.wikipedia.org/wiki/Slurm_Workload_Manager, Last modified Jan. 10, 2020, 4 pgs.
U.S. Department of Commerce, "Security and Privacy Controls for Federal Information Systems and Organizations," NIST, Revision 4, Special Publication 800-53, accessed from http://dx.doi.org/10.6028/NIST.SP.800-553r4, Apr. 2013, updated revision Jan. 22, 2015, 462 pp.
Slurm Workload Manager, Quick Start User Guide, Retrieved on Mar. 2, 2017 from http://slurm.schedmd.com/quickstart.html, Last modified Mar. 31, 2016, 11 pgs.
Robert et al., "Final Report—HOST: HPC Obfuscation and Security Toolkit," Abstract Only accessed from https://www.osti.gov/biblio/1464929-final-report-host-hpc-obfuscation-security-toolkit, Feb. 20, 2018, 3 pp.
Jette et al., "SLURM: Simple Linux Utility for Resource Management" UCRL-MA-147996 REV 3, Jun. 23, 2003, 31 pp.

* cited by examiner

| ORIGINATION TIME | SOURCE | DESTINATION | PRIVILEGE STATUS OF SOURCE | TRAFFIC INFO |
|---|---|---|---|---|
| 259.3918657 | EXTERNAL | COMPUTE1 | UNPRIVILEGED LEVEL 1 | TCP, HTTP SYN |
| 259.3978561 | COMPUTE1 | COMPUTE4 | TRUSTED | ARP, [TARGET IP ADDRESS] |
| 259.4234768 | EXTERNAL | COMPUTE3 | UNPRIVILEGED LEVEL 2 | HTTP GET |
| 259.75645678 | EXTERNAL | COMPUTE6 | UNPRIVILEGED LEVEL 1 | TCP, HTTP FIN ACK |
| 260.1234567 | COMPUTE2 | COMPUTE2 | TRUSTED | DNS, [TARGET DOMAIN NAME] |
| 260.3412567 | EXTERNAL | COMPUTE5 | UNPRIVILEGED LEVEL 1 | TCP, HTTP SYN ACK |
| 260.6734125 | EXTERNAL | DECOY1 | UNPRIVILEGED LEVEL 3 | DNS, [TARGET DOMAIN NAME] |
| 261.1234125 | EXTERNAL | DECOY2 | UNPRIVILEGED LEVEL 3 | HTTP, PUT |
| 261.4125123 | EXTERNAL | DECOY3 | UNPRIVILEGED LEVEL 3 | HTTP, GET |

FIG. 6

OBFUSCATION FOR HIGH-PERFORMANCE COMPUTING SYSTEMS

STATEMENT REGARDING FEDERALLY-SPONSORED RESEARCH OR DEVELOPMENT

This invention was made with government support under Contract No. DE-SC0017195 awarded by the Department of Energy. The government has certain rights in this invention.

TECHNICAL FIELD

The disclosure relates to handling and processing secure data.

BACKGROUND

General purpose, large-scale high-performance computing (HPC) systems are finding wider adoption with the increasing demands for computing power among business, utility, financial, education, scientific, national, and other infrastructure systems. With more general usage, the need for increased availability in such HPC systems has brought forth increased cyber security concerns. The sharing of HPC resources among increasingly unrelated users, as well as the critical nature of certain infrastructure-related applications, are often the cause of these security concerns. Other complicating factors, often prevalent with the use of HPC systems, are the larger variety of principals that could pose a threat and the larger attack surface inherent in distributed and shared computations.

For example, insiders, outsiders, co-tenancy entities, HPC infrastructure vendors and staff, software vendors/lessors, and/or data vendors/lessors are examples of principals that could pose threats. As a result, users and system maintainers of HPC systems need to account not only for external security concerns, but also security concerns that may originate from local threats. An "attack surface" of a software environment represents a sum of all points (or "attack vectors") where unauthorized users (or potential "attackers") can try to enter malicious data to or extract data from the software environment. The attack surface in distributed and shared computations may include data in motion between distributed components, as well as partial or intermediate results that often end up in quasi-persistent storage. The attack surface may also include any orchestration components or any services provided by an HPC supplier, including management interfaces.

Furthermore, many applications must consider security even if they do not necessarily pertain to "national" critical infrastructure, or even infrastructure that is critical to an enterprise. In addition, stakeholders could be using HPC systems for a variety of purposes (e.g., planning, operations, development/testing/maintenance of HPC codes), which modulates the above-described concerns.

SUMMARY

Techniques and system configurations of this disclosure provide an interactive user interface (UI) that enables system maintainers and administrators not only to build and/or update a configuration, but also to perform general monitoring activities. In this way, the system configurations and techniques of this disclosure enable systems with limited computing resources available to use a portion of the resources for cybersecurity without compromising performance. The automated qualities of the obfuscation system described above lend themselves to the interactive UI-based initial configuration and configuration updating capabilities of this disclosure, thereby improving the efficiency and data security of the respective HPC.

Some aspects of this disclosure incorporate the use of decoy nodes and tripwires to provide additional cybersecurity to an HPC computing cluster. The obfuscation system may designate one or more compute nodes as decoy nodes, and use these decoy nodes for system surveillance and reconnaissance. Because the decoy nodes represent spurious assets with respect to the rest of the HPC computing cluster, the obfuscation system can use these decoy nodes as so-called "honeypots" that are partially or entirely dedicated to the purpose of detecting malicious traffic. The obfuscation system of this disclosure may configure the honeypot nodes to invoke "tripwire" functionalities that alert one or more administrator-level nodes of the HPC of information identifying the device(s) from which the malicious traffic originated.

In one example, a method includes initializing, by an obfuscation computing system, communications with a plurality of nodes in a distributed computing platform. The plurality of nodes includes one or more compute nodes that provide one or more resources in the distributed computing platform. The plurality of nodes further includes a controller node that performs resource management of the one or more resources in the distributed computing platform, and the obfuscation computing system serves as an intermediary between the controller node and the one or more compute nodes. The method further includes outputting, by the obfuscation computing system, an interactive user interface (UI) providing a selection between at least a first privilege level and a second privilege level. The method further includes performing, by the obfuscation computing system, at least one of: based on the selection being associated with the first privilege level, a first obfuscation mechanism for the distributed computing platform to obfuscate digital traffic between a user computing system and the plurality of nodes, or based on the selection being associated with the second privilege level, a second obfuscation mechanism for the distributed computing platform to obfuscate digital traffic between the user computing system and the plurality of nodes.

In another example, an obfuscation system includes a memory and processing circuitry in communication with the memory. The processing circuitry is configured to initialize communications with a plurality of nodes in a distributed computing platform. The plurality of nodes includes one or more compute nodes that provide one or more resources in the distributed computing platform. The plurality of nodes further includes a controller node that performs resource management of the one or more resources in the distributed computing platform. The obfuscation system serves as an intermediary between the controller node and the one or more compute nodes. The processing circuitry is further configured to output an interactive user interface (UI) providing a selection between at least a first privilege level and a second privilege level. The processing circuitry is further configured to perform, based on the selection being associated with the first privilege level, a first obfuscation mechanism for the distributed computing platform to obfuscate digital traffic between a user computing system and the plurality of nodes, and to perform, based on the selection being associated with the second privilege level, perform a second obfuscation mechanism for the distributed computing platform to obfuscate digital traffic between the user computing system and the plurality of nodes.

In one example, a non-transitory computer-readable storage medium is encoded with instructions that, when executed, cause processing circuitry of an obfuscation system to initialize communications with a plurality of nodes in a distributed computing platform. The plurality of nodes includes one or more compute nodes that provide one or more resources in the distributed computing platform. The plurality of nodes further includes a controller node that performs resource management of the one or more resources in the distributed computing platform. The obfuscation system serves as an intermediary between the controller node and the one or more compute nodes. The instructions, when executed, further cause the processing circuitry of the obfuscation system to output an interactive user interface (UI) providing a selection between at least a first privilege level and a second privilege level, and to perform one of: based on the selection being associated with the first privilege level, a first obfuscation mechanism for the distributed computing platform to obfuscate digital traffic between a user computing system and the plurality of nodes, or based on the selection being associated with the second privilege level, a second obfuscation mechanism for the distributed computing platform to obfuscate digital traffic between the user computing system and the plurality of nodes.

The techniques and system configurations of this disclosure provide one or more technical improvements and enhanced practical applications. For instance, this disclosure provides enhanced obfuscation and improved monitoring for privileged and unprivileged users, and in some instances, among multiple strata of privilege levels (including one or more unprivileged levels). Using obfuscation measures in a selective way, the obfuscation systems of this disclosure reduce system complexity by omitting obfuscation operations with respect to traffic originated by trusted users, while preserving cybersecurity by obfuscating traffic originating from untrusted users. In some examples, the techniques and system configurations of this disclosure provide further enhancements by repurposing existing, unused compute node infrastructure to perform decoy-based cybersecurity operations. In some examples, the techniques and system configurations of this disclosure provide further enhancements with respect to traffic monitoring over an HPC system.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 6 is a conceptual diagram illustrating one non-limiting example of an activity monitoring interface of this disclosure.

DETAILED DESCRIPTION

Figure 1:
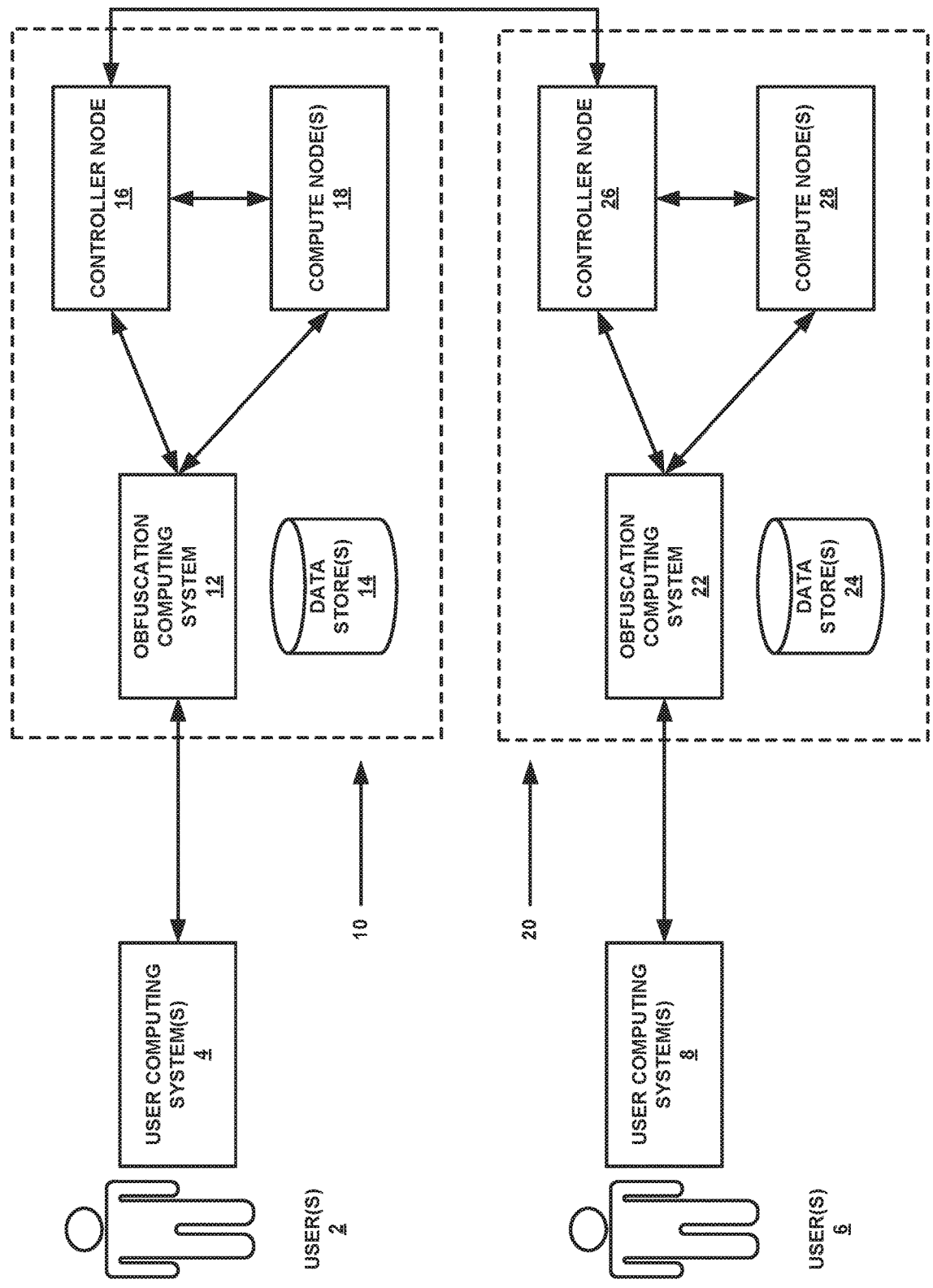
FIG. 1 is a block diagram illustrating example user computing systems and example computing platforms, in accordance with one or more aspects of the present disclosure.

As noted above, the increased use of general purpose, large-scale high-performance computing (HPC) systems has resulted in increased cyber security concerns. Users and system maintainers of HPC systems need to account not only for external but also for local security concerns. Thus, instead of focusing entirely on external risks, secure HPC systems typically must also handle data in a way that enforces data confidentiality among unrelated users of the same system.

Additionally, along with the commodification of HPC resources comes a need to maintain privacy for users on the same system. For example, HPC commands and associated data may contain corporate secrets, sensitive financial information, or political activities and intelligence strategies, to name only a few examples. In some cases, even in a properly secured cluster, metadata from running processes may leak potentially sensitive information. Ideally, unprivileged users would not be able to obtain any information or metadata surrounding the activities of other users.

In many cases, a goal of HPC cybersecurity is to ensure that computational integrity and data confidentiality is maintained. HPC calculations frequently depend on networked instruments, time-critical data, and interactive components. Due to the highly networked and heterogeneous nature of HPC systems, security vulnerabilities can impact computational integrity from many different angles. Potential risks include vulnerable user code, improperly configured system managers or operating systems, or inherent limitations of HPC resource management systems. Traditional data encryption can mitigate these risks, but it ultimately may cause considerable computational overhead.

According to one or more techniques of the present disclosure, a software system for use with or in an HPC system may perform various security operations, including obfuscation and monitoring operations. The software system may, for example, obfuscate the operations of an HPC cluster, protecting data confidentiality and integrity. An example of such an operation is HPC scheduling. The HPC scheduler (i.e. the primary component of an HPC resource management system) determines how resources are allocated to user calculations. Techniques and system configurations of this disclosure enable providing the HPC scheduler with parameters by which to restrict resources from users, based on the privilege level of each user. These aspects of this disclosure enable the HPC system to, in some examples restrict access such that the storage/compute resources of one entity are never shared by another (e.g., competing or adverse) entity, and that neither of these entities is able to detect that it is being restricted to a subset of the overall available resources. In addition to resource partitioning, the aspects of this disclosure enable the HPC system to assign these restrictions based broadly on privilege levels of each user, and also to hide evidence of the partitioning. Other targets for such operations to be obfuscated may include modifying the status of storage resources (e.g., "disk is [X]% full"), changing/anonymizing other usernames in a shared system, changing the reported status (e.g., "in use," "idle," etc.) of computing resources, etc.

Code-level obfuscation refers to the deliberate act of creating information (e.g., computer code) that is difficult for humans to understand, without necessarily changing the core functionality associated with such information. Code obfuscation is a technique that may be used to deter reverse engineering of machine code. The act of obfuscating user-submitted code may raise the bar for any malicious entity trying to snoop on the activities of users. In addition to data and code-level obfuscation, the software system disclosed herein also introduces system and/or network-level obfuscation. By obfuscating not only HPC code, but also status information, system data, network data, configuration information, and the like, sensitive operations can be hidden from unprivileged users or users of intermediate (but not top) level privileges, without necessarily introducing significant computational overhead. In certain examples, the software system comprises a software service that combines or interfaces with the plugins application programming interface (API) of HPC management frameworks (e.g., Simple Linux Utility for Resource Management Workload Manager, or SLURM) to provide, among other things, obfuscation and improved monitoring for privileged and unprivileged users, and in some instances, among multiple strata of privilege levels (including one or more unprivileged levels).

Software systems of this disclosure function to make data snooping, interception, and modification prohibitively difficult for unauthorized users, such that users in a shared HPC environment can have a greater assurance of data integrity and confidentiality. In some examples, the software system may implement a software service that runs primarily alongside the central management process(es) on the cluster's master node, acting as an intermediary between user interactions and system behavior. The software system may incorporate capabilities to wrap user commands and/or system management tasks, allowing cluster behavior to be modified, HPC codes to be obfuscated, and improved system monitoring to be implemented. Thus, in some examples, user interaction and system management tasks may be silently controlled by processes that run as part of, or alongside, the resource management system on an HPC cluster.

Not only does this allow for potentially more selective use of resources on the cluster, but also allows for obfuscation of interactions between nodes in the cluster. In addition, improved feedback and monitoring tools may also enable system maintainers to monitor potentially suspicious activities and permit enhanced transparency for privileged users. Data security assurances on HPC systems may lead to benefits for the general public. For example, users may not have to worry about their data or algorithms being exposed to other users, meaning that organizations can move sensitive computations to shared HPC systems, thereby saving money and increasing computational efficiency. System maintainers can make better use of HPC resources by leasing cycles to unrelated users. Furthermore, computational integrity can be maintained by providing a more consistent and secure environment.

The host systems described above leverage a configuration (or "config") file that controls various core operations of the obfuscation system described above, to provide a more efficient and precise scheme for selecting obfuscation mechanisms for specific portions of traffic. The configuration file maintains a list of HPC users and the respective privilege level corresponding to each listed user, with each respective privilege level being defined as a set of obfuscation mechanisms on specific user requests. The obfuscation system of this disclosure uses the information available from the configuration file to make changes to user requests, depending on the privilege level.

Techniques and system configurations of this disclosure provide an interactive user interface (UI) that enables system maintainers and administrators not only to build and/or update a configuration, but also to perform general monitoring activities. In this way, the system configurations and techniques of this disclosure enable systems with limited computing resources available to use a portion of the resources for cybersecurity without compromising performance. The automated qualities of the obfuscation system described above lend themselves to the interactive UI-based initial configuration and configuration updating capabilities of this disclosure, thereby improving the efficiency and data security of the respective HPC.

Some aspects of this disclosure incorporate the use of decoy nodes and tripwires to provide additional cybersecurity to an HPC computing cluster. The obfuscation system may designate one or more compute nodes as decoy nodes, and use these decoy nodes for system surveillance and reconnaissance. Because the decoy nodes represent spurious assets with respect to the rest of the HPC computing cluster, the obfuscation system can use these decoy nodes as so-called "honeypots" that are partially or entirely dedicated to the purpose of detecting malicious traffic. The obfuscation system of this disclosure may configure the honeypot nodes to invoke "tripwire" functionalities that alert one or more administrator-level nodes of the HPC of information identifying the device(s) from which the malicious traffic originated.

FIG. 1 is a block diagram illustrating example user computing systems and example computing platforms, in accordance with one or more aspects of the present disclosure. In the example of FIG. 1, one or more users 2 may utilize one or more user computing systems 4 to interact with computing platform 10. Similarly, one or more users 6 may utilize one or more user computing system 8 to interact with computing platform 20.

In some cases, users 2 and 6 may be end users of computing platforms 10 and 20, respectively. In other cases, users 2 and 6 may be administrators or maintainers of computing platforms 10 and 20, respectively. Each of user computing systems 4 and 8 may comprise a desktop computing device, a mobile computing device (e.g., mobile phone, tablet computer, personal digital assistant (PDA), laptop computer, wearable computing device), or other type of computing device. Each of user computing systems 4 and 8 may include one or more processors and include, or be otherwise coupled to, one or more display devices. User computing systems 4 and 8, as well as computing platforms 10 and 20, may each include one or more communication units, which are configured to send and receive data. In some examples, these communication units support wireless and/or wired communication and may send and/or receive data using any variety of communication protocols.

Each of computing platforms 10 and 20 may include various resources, including one or more computing nodes. For example, as shown in FIG. 1, computing platform 10 includes an obfuscation computing system 12 (which will be described in further detail below), a controller node 16, one or more compute nodes 18, and one or more data stores 14. Controller node 16 may include one or more computing systems. Each of compute nodes 18 may include one or more computing systems. Data stores 14 may store information that is used by and in computing platform 10, and is accessible to each of obfuscation computing system 12, controller node 16, and compute nodes 18.

As will be described in further detail below, obfuscation computing system 12 may be configured to obfuscate information that is sent to controller node 16 and/or compute nodes 18, and also to receive obfuscated information from controller node 16 and/or compute nodes 18. In some cases, obfuscation computing system 12 may receive information from user computing systems 4, such as user commands and/or data, and obfuscate at least some of the received information prior to sending the information to controller node 16 and/or compute nodes 18. That is, obfuscation computing system may send obfuscated information to controller node 16 and/or to compute nodes 18.

Upon receiving obfuscated response information (e.g., obfuscated command response data) back from controller node 16 and/or compute nodes 18, obfuscation computing system 12 may transform at least some of the obfuscated response information into a non-obfuscated form prior to sending it back to user computing system 4. To transform the obfuscated response information, obfuscation computing system 12 may perform one or more reciprocal operations with respect to the obfuscation operations. The reciprocal operations that obfuscation computing system 12 may perform are referred to as one or more of "deobfuscation," "reverse obfuscation," "unobfuscation," "clarifying," or "deciphering" operations.

Computing platform 20 may include resources similar to those included in computing platform 10. For example, as shown in FIG. 1, computing platform 20 includes an obfuscation computing system 22, a controller node 26, one or more compute nodes 28, and one or more data stores 24. In some examples, each of computing platforms 10 and 20 may comprise HPC computing clusters. HPC computing clusters are, in many cases, distributed platforms having resources that are communicatively coupled with one another (e.g., via one or more networks). In some examples, each of computing platforms 10 and 20 may comprise distributed cloud platforms or systems. Additionally, as shown in the particular example of FIG. 1, computing platform 10 may be communicatively coupled to computing platform 20. For instance, controller node 16 of computing platform 10 may, in some cases, communicate with controller node 26 of computing platform 20.

In various examples, obfuscation computing system 12 may provide a framework for both code-level and system-level obfuscation that support many different obfuscation techniques. In some cases, obfuscation computing system 12 may change the functioning of a task scheduler, the interconnect networking fabric, and/or authenticator implemented by controller node 16 and/or compute nodes 18 in computing platform 10, such that computing platform 10 may function in unpredictable ways. In these cases, obfuscation computing system 12 may mask metadata that might potentially compromise the security of user computing platform 10.

By providing an intermediate control source, obfuscation computing system 12 may obtain a granular control over processes, process interactions, and resource allocation in computing platform 10. During execution, obfuscation computing system 12 may act as an intermediate redirection layer between controller node 16 and compute nodes 18. By redirecting resource allocation tasks back through obfuscation computing system 12, computing platform 10 may, as one non-limiting example, be able to implement randomization techniques on compute resources. Obfuscation 22 may provide similar functionality with respect to computing platform 20.

Furthermore, in addition to providing system-level obfuscation functionality, obfuscation computing systems 12 and 22 may also provide code-level obfuscation functionality. For example, in some examples, obfuscation computing system 12 may respond to user commands from user computing systems 4. As will be described in more detail below, obfuscation computing system 12 may obfuscate input data for these commands before passing the obfuscated data on to controller node 16 and/or compute nodes 18. Obfuscation computing system 12 may then deobfuscate the obfuscated response data received from controller node 16 and/or compute nodes 18 (e.g., via translation or transformation) before sending responses back to user computing system 4.

In general, in one example, each of obfuscation computing systems 12 and 22 may be configured to obfuscate code, data inputs, data outputs, and intermediate results processed within respective computing platforms 10 and 20, making it more difficult for potential attackers to gain access to protected data. In examples where obfuscation computing systems 12 and/or 22 perform code obfuscation, obfuscation computing system 12 may obfuscate user codes by transforming input binaries or commands received from user computing system 4. For instance, obfuscation computing systems 12 may transform the received data into obfuscated binaries or obfuscated commands that can be processed by controller node 16 and/or compute nodes 18. Similarly, obfuscation computing system 22 may obfuscate user codes by transforming input binary codes or commands received from user computing systems 8 into obfuscated binary codes or commands processed by controller node 26 and/or compute nodes 28.

HPC code or commands commonly use large datasets as inputs. These large datasets may, in turn, contain private or proprietary information. To protect private or proprietary information, obfuscation computing systems 12 and 22 may implement one or more transformation (e.g., encryption) techniques to transform the input data into unreadable or misleading (e.g., obfuscated) data. Obfuscation computing systems may then use obfuscated code to operate directly on the obfuscated/encrypted data. For example, a bank may process a dataset that includes customer savings values, account-identifying information, personal information of the customers, etc.

Obfuscation computing system 12 serves as an intermediary between controller node 16 and compute nodes 18. Similarly, obfuscation computing system 22 serves as an intermediary between controller node 26 and compute nodes 28. Obfuscation computing systems 12 and 22 may implement various techniques of this disclosure to provide an interactive user interface (UI) via user computing systems 4 and 8 respectively, and to base obfuscation-related decisions on input received via the interactive UI. In some examples, obfuscation computing systems 12 and 22 may require user authentication before enabling a user to provide input via the interactive UI. For example, obfuscation computing systems 12 and 22 may require an authentication-based (e.g., whether by alphanumeric password, by biometric information, etc.) showing that the user is a system administrator or maintainer.

Subject to receiving satisfactory authentication information via user computing system 4, obfuscation computing system 12 may analyze input received via the interactive UI to generate or modify a configuration (or "config") file that controls obfuscation measures implemented over computing platform 10. Obfuscation computing system 12 may form the interactive UI to include UI elements that provide selectable choices with respect to user identities and privilege levels. For instance, obfuscation computing system 12 may form the interactive UI to include a mapping capability between individual users and various privilege levels that form a tiered hierarchy.

According to various implementations of the techniques described herein, obfuscation computing system 12 may set various numbers of strata with respect to user privileges, thereby implementing multiple privileged levels and/or multiple unprivileged levels. In one non-limiting example, obfuscation computing system 12 may list two available privilege levels, where a first privilege level indicates a trusted user and a second privilege level indicates an unproven user. In turn, obfuscation computing system 12 may receive user inputs mapping individual users to one of the two privilege levels, which are referred to herein as "privileged" and "unprivileged" levels or tiers. Depending on the privilege level with which a particular user is mapped, according to input received from the system administrator or maintainer operating the interactive UI via user computing system 4, obfuscation computing system 12 may select a particular obfuscation mechanism (or none at all) to apply to traffic originating from the particular user's computing device(s).

In one example implementation under multi-tiered privilege systems of this disclosure (such as, but not limited to, the two-tiered privilege system described above), obfuscation computing system 12 may forward or otherwise process all digital data traffic originating from devices associated with the privileged level without applying any obfuscation measures to the data. That is, because the "privileged" level indicates that the devices belong to a trusted user of computing platform 10, obfuscation computing system 12 may determine that requests and other traffic originating from the devices are safe, and need not be altered via any of the obfuscation techniques described above.

In this example, obfuscation computing system 12 may apply obfuscation measures to digital data traffic originating to devices that obfuscation computing system 12 determines are associated with the unprivileged level. That is, because the "unprivileged" level indicates that the devices belong to an untrusted user of computing platform 10, obfuscation computing system 12 may determine that requests and other traffic originating from the devices are to be subjected to the added cybersecurity measure of obfuscation, until the user of these devices attains trusted status indicated by an administrator or maintainer's assignment of the "privileged" level to the user.

Obfuscation computing system 12 may, in some cases, be configured to perform system-level obfuscation in computing platform 10. Obfuscation computing system 12 may be configured to performing the system-level obfuscation at least by obfuscating system management tasks that are performed to manage nodes 16, 18, and/or by obfuscating network traffic data that is exchanged between nodes 16, 18. Furthermore, obfuscation computing system 22 may be configured to perform similar operations with respect to nodes 26, 28 in computing platform 20, which interacts with user computing system 8.

As such, one or both of obfuscation systems 12 and 22 represent an obfuscation system including a memory and processing circuitry in communication with the memory. The processing circuitry is configured to initialize communications with a plurality of nodes in a distributed computing platform. The plurality of nodes includes one or more compute nodes that provide one or more resources in the distributed computing platform. The plurality of nodes further includes a controller node that performs resource management of the one or more resources in the distributed computing platform. The obfuscation system serves as an intermediary between the controller node and the one or more compute nodes. The processing circuitry is further configured to output an interactive user interface (UI) providing a selection between at least a first privilege level and a second privilege level. The processing circuitry is further configured to perform, based on the selection being associated with the first privilege level, a first obfuscation mechanism for the distributed computing platform to obfuscate digital traffic between a user computing system and the plurality of nodes. The processing circuitry is further configured to perform, based on the selection being associated with the second privilege level, a second obfuscation mechanism for the distributed computing platform to obfuscate digital traffic between the user computing system and the plurality of nodes.

In some examples, the first privilege level is associated with privileged users of the user computing system. In these examples, to perform the first obfuscation mechanism, the processing circuitry is configured to forward the digital traffic between the user computing system and the plurality of nodes in unaltered form. In some examples, the obfuscation computing system further includes a network interface in communication with the processing circuitry. In these examples, to forward the digital traffic, the processing circuitry is configured forward the digital traffic via the network interface.

In some examples, the second privilege level is associated with unprivileged users of the user computing system. In these examples, to perform the second obfuscation mechanism, the processing circuitry is configured to apply code-level obfuscation to the digital traffic between the user computing system and the plurality of nodes in unaltered form. In some examples, to apply the code-level obfuscation, the processing circuitry is configured to obfuscate data associated with one or more received from the user computing system to generate one or more obfuscated commands, and to send the one or more obfuscated commands to at least one of the plurality of nodes in the distributed computing platform.

In some examples, the processing circuitry is further configured to receive, via the interactive UI, an indication of the selection. In some examples, the obfuscation system further includes an input device. In these examples, to receive the indication of the selection, the processing circuitry is configured to receive the indication of the selection via the input device and via the interactive UI.

Figure 2:
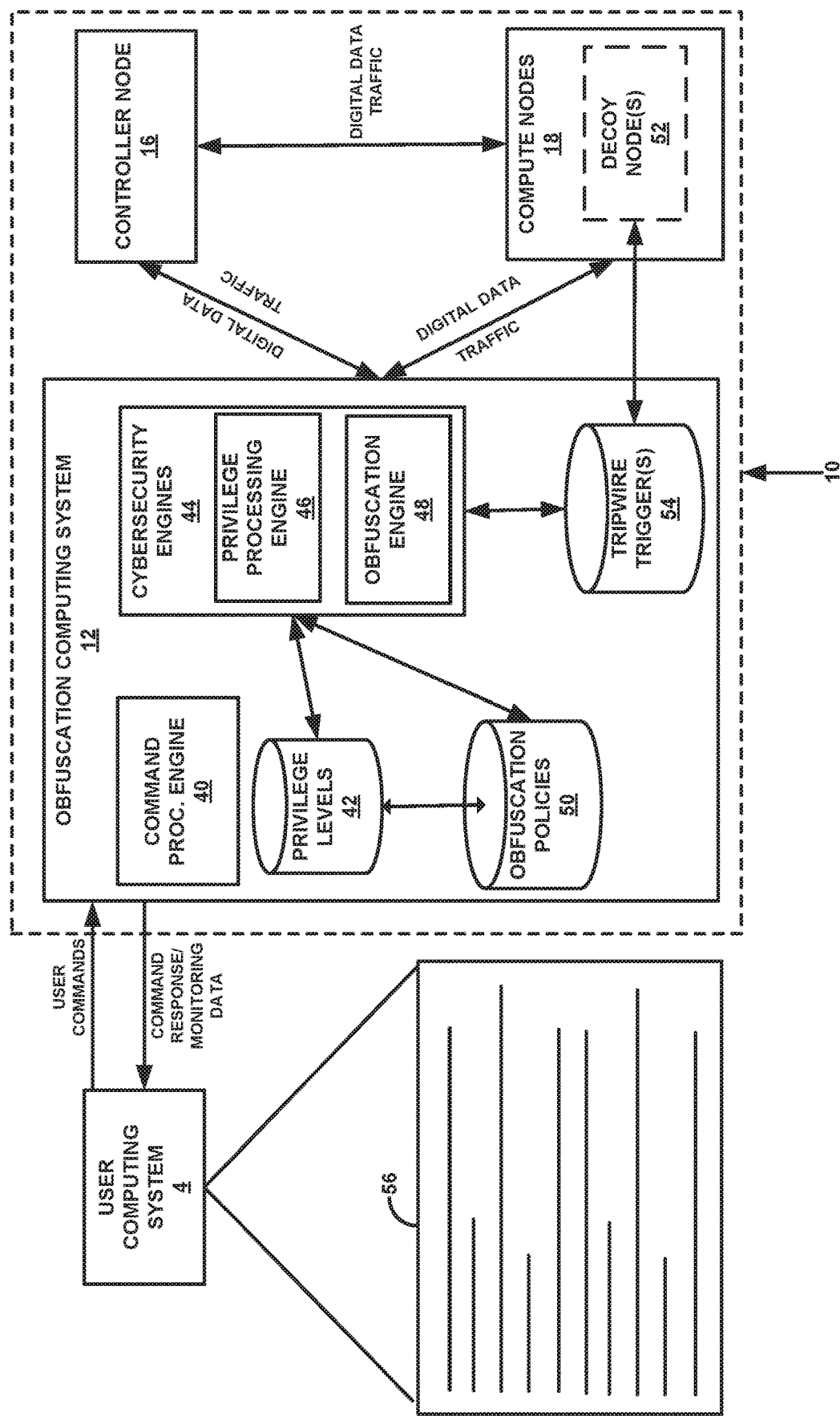
FIG. 2 is a block diagram illustrating further example details of one of the computing platforms shown in FIG. 1, in accordance with one or more aspects of the present disclosure.

FIG. 2 is a block diagram illustrating example further details of computing platform 10 shown in FIG. 1, in accordance with one or more aspects of the present disclosure. As shown in FIG. 2, user computing system 4 may output an interactive user interface (UI) 56, and may relay user commands to computing platform 10. Computing platform 10 may send command response and/or monitoring data back to user computing systems 4, as shown in FIG. 2. Computing platform 10 includes obfuscation computing system 12 (hereinafter referred to as "obfuscation computing system 12") controller node 16, and one or more compute nodes 18. Obfuscation computing system 12 may send digital data traffic to, and receive digital data traffic from, controller node 16 and/or compute nodes 18. In addition, controller node 16 and compute nodes 18 may exchange digital data traffic directly or indirectly.

In the implementation illustrated in FIG. 2, obfuscation computing system 12 includes a command processing engine 40 and cybersecurity engines 44. Command processing engine 40 is configured to manage commands and associated command data that are processed by obfuscation computing system 12. For example, command processing engine 40 may process incoming commands that are received from user computing systems 4. Command processing engine 40 may invoke cybersecurity engines 44 to analyze data associated with these commands to determine cybersecurity measures on a case-by-case basis with respect to each command or group of commands. Upon receiving command response data (whether in deobfuscated form or in unaltered form) back from cybersecurity engines 44 (e.g., after controller node 16 and/or compute nodes 18 have processed obfuscated commands and/or data, which are deobfuscated by obfuscated engines 44), command processing engine 40 may provide the deobfuscated command response data back to user computing systems 4.

Cybersecurity engines 44 may analyze the command-related data based on parameters obtained from privilege levels 42, and may further process the analyzed command-related data based on obfuscation policies 50. For instance, when analyzing a command or set of commands, privilege processing engine 46 of cybersecurity engines 44 may use information obtained from privilege levels 42 to determine the privilege level (e.g., tier) to which a user operating user computing system 4 is assigned. Based on the privilege level assigned to the command-originating user, obfuscation engine 48 of cybersecurity engines 44 may select one or more of obfuscation policies 50 to be applied to the command data before relaying the command data to controller node 16 and/or one or more of compute nodes 52 as digital data traffic.

In some examples, cybersecurity engines 44 may not invoke obfuscation 48 to obfuscate the command data, if privilege processing engine 46 determines, based on privilege levels 42, that the user originating the command under analysis is a trusted user. In these examples, if privilege processing engine 46 determines that the user originating the command under analysis is not a trusted user, cybersecurity engines 44 may invoke obfuscation engine 48 to implement one or more obfuscation techniques on the command data before forwarding the command data as digital data traffic to controller node 16 and/or one or more of compute nodes 18.

Obfuscation engine 48 may provide one or both of code-level and/or system-level obfuscation functionalities. It will be appreciated that cybersecurity engines 44 may include separate code obfuscation and system obfuscation engines, although both sets of functionalities are described herein with respect to obfuscation engine 48 for ease of illustration and discussion. Obfuscation engine 48 may obfuscate codes or commands received from command processing engine 40. In addition, obfuscation engine 48 may obfuscate any data (e.g., input data, output data) associated with these codes or commands.

Obfuscation engine 48 may send obfuscated code and/or command data to controller node 16 and/or to compute nodes 18, and may also subsequently receive obfuscated response data from controller node 16 and/or from compute nodes 18. In such fashion, controller node 16 and/or compute nodes 18 do not process the same codes, commands, and/or data provided by command processing engine 40 or received from user computing system 4. Instead, controller node 16 and/or compute nodes 18 process obfuscated data that is more difficult to discern, or might even be misleading, to any individuals or entities attempting to analyze or decipher the data being sent to or processed by controller node 16 and/or compute nodes 18.

As described previously, in some cases, obfuscation engine 48 may obfuscate data that is associated with a code or command, such as input or output data. In some cases, obfuscation engine 48 may implement one or more encryption techniques (e.g., homomorphic encryption techniques) to transform input data into obfuscated (e.g., unreadable or misleading) data. Obfuscation engine 48 may obfuscate or bypass obfuscation of the actual command that is received from command processing engine 40. In either case, cybersecurity engines may pass the command, either in original, unaltered form, or in obfuscated form, along with the obfuscated input data, to controller node 16 and/or compute nodes 18.

Obfuscation engine 48 may be configured to modify how a command is compiled or otherwise interpreted for execution in computing platform 10, and/or may change the binary version of the command that is executed. Similarly, obfuscation engine 48 may be configured to modify the input and/or output data associated with a command or code, such as described above. Upon receiving obfuscated response data from controller node 16 and/or compute nodes 18, obfuscation engine 48 may be configured to deobfuscate the obfuscated code or command, in cases in which obfuscation engine 48 had previously obfuscated the original code or command provided by command processing engine 40.

Upon deobfuscating any data received from controller node 16 and/or compute nodes 18, obfuscation engine 48 may provide deobfuscated response data, which may include deobfuscated data, back to command processing engine 40. Command processing engine 40 may relay the command response data back to user computing system 4. The command response data provided back to user computing system 4 does not include any obfuscated information, because of the debfuscation processing applied by obfuscation engine 48. In this way, computing platform 10 provides response data to user computing system 4 that a user or other entity can readily understand.

Obfuscation engine 48 may also provide system-level obfuscation functionalities. In some cases, obfuscation engine 48 may change or alter various system-level functions (e.g., task scheduling, networking/interconnections, resource selection, logging, authentication) to execute in unpredictable ways. For instance, obfuscation engine 48 may mask metadata that potentially compromises the security of the user. By serving as an intermediate control source between user computing system 4 and nodes 16 and 18, obfuscation computing system 12 may be configured to provide granular control over processes executed by nodes 16 and 18, interactions between such processes, and the mechanisms by which resources are allocated.

Obfuscation computing system 12 may use cybersecurity engines 44 to process user commands received from user computing system 4, via command processing engine 40. In addition, obfuscation computing system 12 may also provide system-level obfuscation by invoking obfuscation engine 48, in certain scenarios. As a result, obfuscation computing system 12 may act as an intermediate redirection layer for command processing and system-level tasks. For instance, as one non-limiting example, with respect to system-level tasks, obfuscation computing system 12 may act as an intermediate redirection layer for resource allocation tasks, such that obfuscation computing system 12 may implement various techniques (e.g., randomization techniques) on computing resources (e.g., resources provided by one or more of compute nodes 18) of computing platform 10.

In instances in which privilege processing engine 46 determines that data received from command processing engine 40 and/or nodes 16 or 18 originated from an untrusted user, cybersecurity engines 44 invoke obfuscation engine 48. For example, obfuscation engine 48 may utilize one or more obfuscation policies 50 during execution of cybersecurity engines 44. Again, obfuscation policies 50 may include one or more policies associated with code-level obfuscation functionalities, such as policies that set forth command data encryption or decryption. Obfuscation engine 48 may utilize these ones of obfuscation policies 50 to apply code-level obfuscation to command data or response data associated with a user that privilege processing engine 46 identifies as being untrusted.

Obfuscation policies 50 may also include one or more different policies associated with system obfuscation-level functionality, such as policies associated with one or more of task scheduling, networking/interconnections, resource selection, logging, authentication, etc. Obfuscation engine 48 may utilize these ones of obfuscation policies 50 to implement system-level obfuscation operations. Obfuscation policies 50 are customizable and may be modified by, e.g., an administrator or maintainer of computing platform 10, to change the operational behavior of cybersecurity engines 44. For example, the administrator/maintainer of computing platform 10 may provide the obfuscation policy information via interactive UI 56. That, while interactive UI 56 is primarily discussed in this disclosure with respect to enabling administrators/maintainers to set user privilege levels, it will be appreciated that interactive UI is polymorphic, and may also provide additional (e.g., policy-defining) capabilities to administrators and maintainers of computing platform 10.

In some examples, obfuscation computing system 12 may designate one or more of compute nodes 18 as decoy nodes 52. The optional designation of decoy nodes 52 is illustrated in FIG. 2 using dashed line borders. If obfuscation computing system 12 determines that one or more of compute nodes 18 is not currently in use, then obfuscation computing system 12 may repurpose these currently-unused compute node(s) 18 as so-called "honeypots." For instance, obfuscation computing system 12 may logically isolate decoy nodes 52, and may monitor the digital data traffic sent to or requested from decoy nodes 52, based on the reassignment of decoy nodes 52 as honeypots. By incorporating honeypot architecture into the obfuscation-based cybersecurity functions described above, obfuscation computing system 12 expands the cybersecurity functionality into additional levels of deception and obfuscation.

Obfuscation computing system 12 implement additional deception-based functionalities by using decoy nodes 56 to determine whether one or more tripwire triggers 54 has been provoked. Tripwire triggers 54 represent scenarios in which obfuscation computing system 12 infers malicious or otherwise potentially harmful behavior, based on the digital data traffic being sent to or elicited from decoy nodes 52. While honeypots generally refer to virtualized or otherwise artificial system resources that are configured to masquerade as a genuine compute resource, obfuscation computing system 12 implements techniques of this disclosure to extend honeypot techniques to actual compute resources that are currently unused, namely, decoy nodes 52. Similar to virtual machine-based honeypots, decoy nodes 52 have no real practical use at the time of their honeypot designation.

In this way, the honeypot-tripwire aspects of this disclosure enable obfuscation computing system 12 to incorporate honeypot-based deception mechanisms into computing platform 10 using existing hardware infrastructure, and without the need to add new nodes purely for honeypot designation.

In these examples, in addition to leveraging user-to-privilege level mappings, obfuscation computing system adds an additional class (e.g., layer) of mappings between other HPC assets of computing platform 10 and obfuscation behaviors. Not only does obfuscation computing system 12 obfuscate sensitive assets with fictitious information, but also generates spurious assets (in the form of repurposed decoy nodes 52) that instigate alerts when tampered with (as determined from tripwire triggers 52). The alerts may be generated by decoy nodes 52, by obfuscation computing system 12 (or components thereof, such as cybersecurity engines 44), or any combination there. For existence, obfuscation computing system 12 may store tripwire files (which include fictitious sensitive information) to decoy nodes 52. If obfuscation computing system 12 detects an attempt to access or modify any of the tripwire files stored to decoy nodes 52, obfuscation computing system 12 determines that one of tripwire triggers 54 has been invoked. In this eventuality, obfuscation computing system 12 may send an alert or other signal to user computing system 4 to inform the administrator/maintainer of a likely tampering attempt or likely cyber-attack.

Again, obfuscation computing system 12 implements the techniques of this disclosure to create honeypot assets without calling for any extra computational overhead. That is, obfuscation computing system 12 leverages assets that are not currently an active part of the compute environment of computing platform 10. Rather than implementing virtualization into the HPC cluster of computing platform 10, obfuscation computing system 12 implements cybersecurity measures with respect to the results of reconnaissance operations with dormant or unused nodes of compute nodes 18, namely, decoy nodes 52. If obfuscation computing system 12 detects that decoy nodes 52 are probed (based on comparing activity to tripwire triggers 54), obfuscation computing system 12 may identify the malicious or otherwise potentially harmful user in a dashboard displayed via interactive UI 56.

The architecture of computing platform 10 is well suited for the type of deceptive activity described above with respect to using decoy nodes 52. For instance, user computing system 4 may update the config file for computing platform 10 to include asset-identifying information for decoy nodes 52. According to the tenets of the updated config file, obfuscation computing system 12 may track assets such as network devices, files, or encryption keys alongside the existing collections of users set forth in the config file. User computing system 4 may implement a daemon depending on the type of interaction taking place. Under normal circumstances, the digital assets of decoy nodes 52 will not be contacted, and will not impose computational overhead.

In the event that the digital assets of decoy nodes 52 are indeed contacted, obfuscation computing system 12 may classify/categorize the malicious user, and may implement preventive measures without incurring extraneous hardware overhead. In this way, the techniques and system configurations of this disclosure make computing platform 10 a more powerful platform for identifying and reacting to malicious or otherwise potentially harmful activities. Using existing compute nodes 18 as decoy nodes 52, and by comparing traffic to tripwire triggers 54, obfuscation computing system 12 introduces a low computational overhead approach to cybersecurity deception that is effective at identifying insider threats.

According to some aspects of this disclosure, obfuscation computing system 12 may perform reactive measures, in response to detecting potentially harmful attempts to access decoy nodes 52. In one example, obfuscation computing system 12 may communicate, to user computing system 4, a user identity associated with the access request. In this example, obfuscation computing system 12 enables user computing system 4 to output the (potentially) malicious user's identity to system administrators or system maintainers via interactive UI 56. In turn, the system administrators or system maintainers may take preventive actions, such as by providing input via interactive UI 56 to blacklist the user identity.

In some examples, obfuscation computing system 12 and/or user computing system 4 may automatically implement preventive steps in response to obfuscation computing system 12 detecting the potentially harmful attempt to access decoy nodes 52. For instance, obfuscation computing system 12 and/or user computing system 4 may automatically isolate/quarantine any devices that send communications identified as being associated with the potentially malicious user identity.

For instance, in an isolation/quarantining scenario, computing system 12 and/or user computing system 4 may block any outgoing traffic from compute nodes 18 or controller node 16 that identify the isolated/quarantined device as a destination. In some examples, computing system 12 and/or user computing system 4 may trap all future incoming traffic from the isolated/quarantined device either indefinitely or for a finite period of time to determine whether the device does indeed pose a potential threat to the security of computing platform 10.

Obfuscation computing system 12 may also provide monitoring data or monitoring information back to user computing system 4. This monitoring data may include monitoring information gathered from and/or generated by computing platform 10. In some cases, the monitoring information may include system performance and other diagnostic information associated with computing platform 10 (e.g., performance or diagnostics associated with controller node 16 and/or compute nodes 18). User computing system 4 may utilize any such monitoring information received from obfuscation to log, analyze, or otherwise process activities carried out over computing platform 10.

In some cases, the monitoring information may further include information associated with execution of cybersecurity engines 44 during allocation of resources in computing platform 10 and/or execution of tasks by nodes 16 and/or 18. Obfuscation computing system 12 may generate the monitoring data to also include information associated with obfuscation policies 50 that are used by cybersecurity engines 44. In some examples, user computing system 4 may set permissions on the monitoring information such that only certain privileged or authorized users (e.g., those with administrator or maintainer status) of user computing system 4 or computing platform 10 can access portions of the monitoring information via user computing system 4.

In some cases, user computing system 4 may use portions of interactive UI 56 to provide a visualization tool that outputs the monitoring data in human-readable format. In certain instances, user computing system 4 may utilize interactive UI 56 to provide monitoring and management capabilities to authorized users with respect to the functioning of computing platform 10. That is, in these instances, user computing system 4 may enable the authorized to users to avail of these capabilities by using the monitoring data received from obfuscation computing system 12 (e.g., to modify obfuscation policies 50).

For example, user computing system 4 may enable system administrators and system maintainers to use visualization tools of interactive UI 56 to view the code-level obfuscation policies of obfuscation policies 50. User computing system 4 may also enable the system administrators and system maintainers to provide input via interactive UI 56 to update the code-level obfuscation policies included in obfuscation policies 50. In this way, user computing system 4 may enable system administrators and system maintainers to modify the run-time behavior of obfuscation computing system 12 with respect to computing platform 10. System administrators and system maintainers may invoke certain tools via interactive UI 56 to view and/or update the system-level obfuscation policies includes in obfuscation policies 50 to modify the run-time behavior of cybersecurity engines 44.

In this way, obfuscation computing system 12 represents an obfuscation system including processing circuitry configured to designate at least one node of a plurality of nodes as a decoy node, and to detect a portion of the digital traffic that requests access to the decoy node. Based on the portion of the digital traffic requesting the access to the decoy node, the processing circuitry may determine that a user identity requesting the access to the decoy node is a malicious user identity, and may initiate a tripwire functionality with respect to the malicious user identity. In some examples, to initiate the tripwire functionality with respect to the malicious user identity, the processing circuitry is configured to update the interactive UI identifying the malicious user identity.

In some examples, to designate the at least one node as the decoy node, the processing circuitry is configured to determine that the at least one decoy node is dormant with respect to activity over the distributed computing platform, and to select the at least one node to be designated as the decoy node based on the at least one node being dormant with respect to the activity over the distributed computing platform. In some examples, the processing circuitry is further configured to the processing circuitry is further configured to monitor the digital traffic over the distributed computing platform, and to output, via the interactive UI, information describing the monitored digital traffic.

Command processing engine 40 and/or cybersecurity engines 44 may be implemented individually or in partial or full combination as processing circuitry. Similarly, privilege processing engine 46 and/or obfuscation engine 48 may be implemented individually or in partial or full combination as processing circuitry. In general, various functionalities ascribed herein with respect to user computing system 4 and/or obfuscation computing system 12 may be implemented by processing circuitry in communication with one or more memory devices.

Examples of the processing circuitry of user computing system 4 and/or obfuscation computing system 12 include, but are not limited to, one or more digital signal processors (DSPs), general purpose microprocessors, application specific integrated circuits (ASICs), field programmable logic arrays (FPGAs), fixed function circuitry, programmable processing circuitry, various combinations of fixed function with programmable processing circuitry, or other equivalent integrated circuitry or discrete logic circuitry. The processing circuitry of obfuscation computing system 12 may include, be, or be part of the central processing unit (CPU) of obfuscation computing system 12. Some components of computing system 10 may be specialized hardware, such as integrated and/or discrete logic circuitry that provide specific functionalities, and optionally, that implement parallel processing capabilities with respect to the processing circuitry of obfuscation computing system 12.

One or more of privilege levels 42, obfuscation policies, and/or tripwire triggers 54 may be stored to one or more memory or data storage devices or components of obfuscation computing system 12. One or more storage devices of obfuscation computing system 12 are configured to store information within obfuscation computing system 12 before, during, or after operation. The storage devices of obfuscation computing system 12, in some examples, are collectively described as a computer-readable storage medium. In some examples, a storage device of obfuscation computing system 12 include a temporary memory, meaning that a primary purpose of the respective storage device is not long-term storage.

One or more of the storage devices of obfuscation computing system 12, in some examples, are described as a volatile memory, meaning that these particular storage devices do not maintain stored contents when the computer is turned off. Examples of volatile memories include random access memories (RAM), dynamic random access memories (DRAM), static random access memories (SRAM), and other forms of volatile memories.

In some examples, one or more storage devices of obfuscation computing system 12 are used to store program instructions for execution by the processing circuitry of obfuscation computing system 12. The respective storage device is, in some examples, used by software or applications running on obfuscation computing system 12 to temporarily store information during program execution. As described above, the storage devices of obfuscation computing system 12, in some examples, include one or more computer-readable storage media. The storage devices of obfuscation computing system 12 may be configured to store larger amounts of information than volatile memory.

The storage devices may further be configured for long-term storage of information. In some examples, the storage devices of obfuscation computing system 12 include non-volatile storage elements. Examples of such non-volatile storage elements include solid state drives (SSDs), magnetic hard discs, optical discs, floppy discs, flash memories (e.g., including removable devices connectable via USB®), or forms of electrically programmable memories (EPROM) or electrically erasable and programmable (EEPROM) memories.

While various hardware components have been described above with respect to obfuscation computing system 12 as an example, it will be appreciated that one or more user computing system 4, controller node 16, and/or compute nodes 18 may also incorporate similar hardware components.

Figure 3:
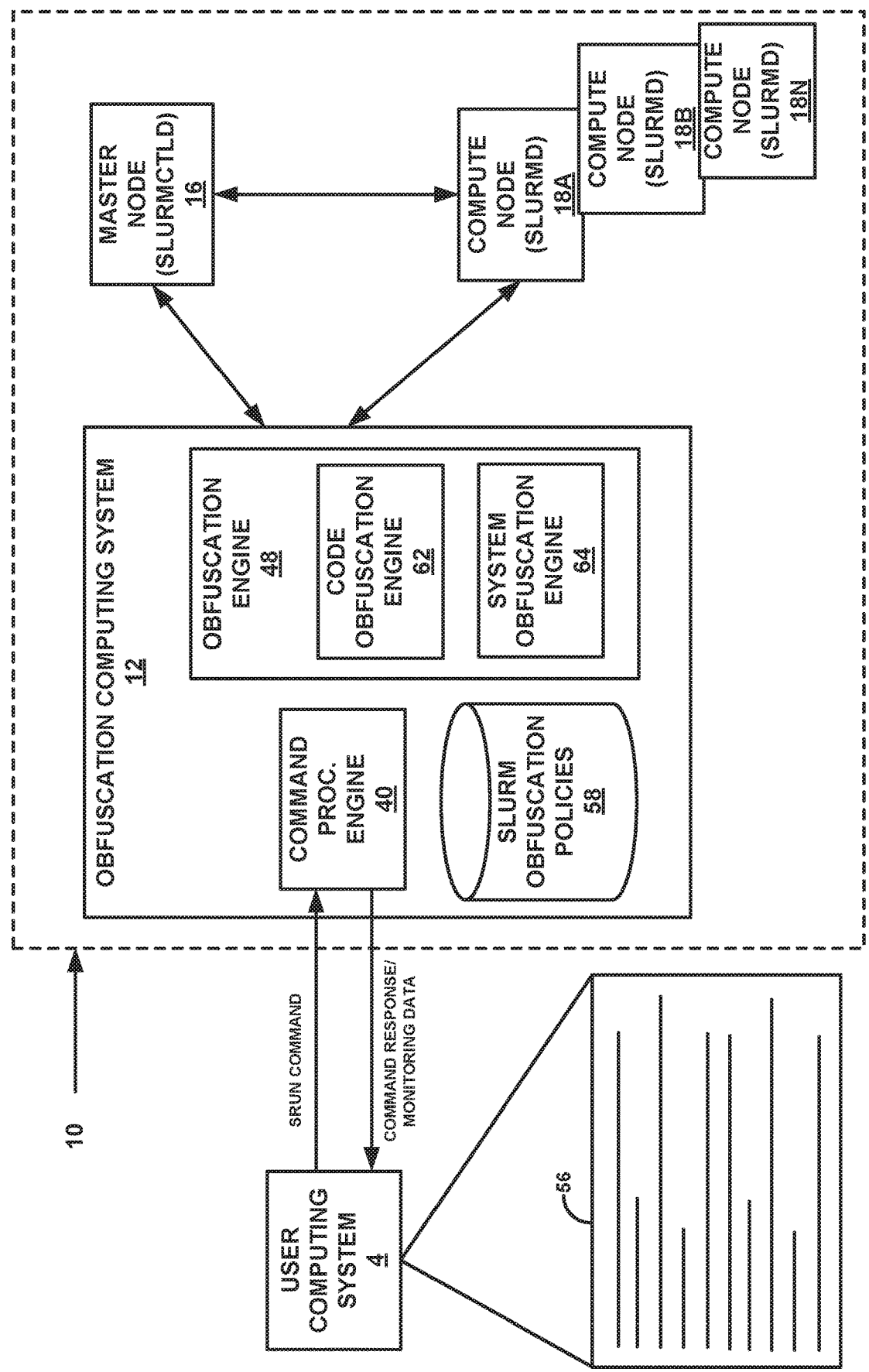
FIG. 3 is a block diagram illustrating another example of the computing platform shown in FIGS. 1 and 2, in accordance with one or more aspects of the present disclosure.

FIG. 3 is a block diagram illustrating another example implementation of computing platform 10 shown in FIGS. 1 and 2, in accordance with one or more aspects of this disclosure. In the non-limiting example of FIG. 3, computing platform 10 implements a workload management system known as Simple Linux Utility for Resource Management, or SLURM. In this example, computing platform 10 may comprise a high-performance computing cluster (hereinafter "HPC cluster 10" in reference to FIG. 3), where controller node 16 represents a master node (SLURMCTLD) (hereinafter "master node 16" in reference to FIG. 3) that serves as a resource manager in HPC cluster 10. HPC cluster 10 may represent a highly distributed system of resources (e.g., resources provided by compute nodes 18), which provides high bandwidth and supports high volumes of network traffic.

Compute nodes 18 of this HPC cluster 10 are compute nodes (SLURMDs) 18A-18N (hereinafter "compute nodes 18" in reference to FIG. 3) that serve as or otherwise provide resources in HPC cluster 10. HPC cluster 10 may allocate exclusive and/or non-exclusive access to compute nodes 18 for some duration of time, and may provide a framework for starting, executing, and/or monitoring work on a set of allocated nodes. HPC cluster 10 may also arbitrate contention for resources by managing one or more queues of pending jobs. SLURM obfuscation policies 58 shown in FIG. 3 may include SLURM obfuscation policies that are used by obfuscation engine 48 during implementation of SLURM by HPC cluster 10. SLURM is built for extensibility, allowing extra features to be added without having to account for significant extra development overhead.

As illustrated in FIG. 3, all interactions between user computing system 4 and processes executing on master node 16 and/or compute nodes 18 pass through obfuscation computing system 12. In this way, obfuscation computing system 12 serves as an intermediary between user computing system 4 and nodes 16, 18. By way of its intermediary functions, obfuscation computing system 12 functions as a wrapper for SLURM behaviors and responses. In addition, obfuscation computing system 12 may also act as an intermediary between master node 16 and compute nodes 18. Obfuscation engine 48 includes code obfuscation engine 62 and system obfuscation engine 64. In the example of FIG. 3, code obfuscation engine 62 provides the various code-level obfuscation functionalities ascribed herein to obfuscation engine 48, while system obfuscation engine 64 provides the various system-level obfuscation functionalities ascribed herein to obfuscation engine 48.

Obfuscation computing system 12 uses command processing engine 40 to intercept commands from user computing systems 4 and instructs corresponding ones of nodes 16 and/or 18 to respond. To prevent malicious users or usurped computing devices from snooping directly on the activities of nodes 16 and/or 18, obfuscation computing system 12 also is configured to obfuscate system behavior (e.g., using obfuscation engine 48). Thus, obfuscation computing system 12 may fit within the plugin architecture of SLURM to reconfigure or modify the runtime operation of SLURM in HPC cluster 10.

Command processing engine 40 acts as an interface between user computing system 4 and the underlying system resources (e.g., resources of compute nodes 18) in HPC cluster 10. Users of user computing system 4 may issue commands that are then routed to command processing engine 40 of obfuscation computing system 12. Command processing engine 40 provides the commands to code obfuscation engine 62 of obfuscation engine 48, which augments the commands with obfuscation procedures before passing on the commands to master node 16 and/or compute nodes 18.

Responses to user commands may, in some cases, be obfuscated to return absent or misleading information from master node 16 and/or compute nodes 18 back to code obfuscation module 46. Code obfuscation engine 62 may obfuscate the commands or code (e.g., message passing interface (MPI) code), data inputs associated with such commands or code, data outputs associated with execution of the commands or code, and/or any intermediate results on the cluster. In some cases, code obfuscation engine 62 may transform input binaries into obfuscated binaries. Obfuscating these interfaces raises the bar for attackers attempting to read protected, secure, or sensitive data from HPC cluster 10.

In many cases, it is common for HPC commands or codes to have large datasets as inputs. Large datasets often contain private or proprietary information. To protect such information in these datasets, code obfuscation engine 62 may, in various examples, implement simple encryption techniques to transform data (e.g., input data for commands) into obfuscated data, which may be unreadable and/or misleading, and then pass the obfuscated commands (which include or are otherwise associated with the obfuscated data) to master node 16 and/or compute nodes 18, which may then use the obfuscated commands to operate directly on the encrypted data.

For example, a bank may generate, receive, or process a dataset filled with sensitive information, such as customer savings values. In a non-limiting example, code obfuscation engine 62 may apply a known transformation (e.g., encryption) to account balances for storage in HPC cluster 10, and later introduce a complementary transformation step when computations on the encrypted account balance data take place. Code obfuscation engine 62 may subsequently decrypt the encrypted account balance data (e.g., when providing such decrypted account balance data to a user, such as user 2 or user 6). By using a simple homomorphic encryption scheme with obfuscated code, it becomes possible to operate on data that has been obfuscated. In some cases, using obfuscation as a weak form of encryption may incur a potentially lower computational cost than strong encryption while still providing protection for proprietary data.

In one particular non-limiting use case, user computing system 4 may send an "srun" SLURM command to command processing engine 40, which is one example of an HPC code. Command processing engine 40 and/or code obfuscation engine 62 may provide a command line interface (CLI) for interpreting user commands, such as the "srun" command. The CLI may act as a software layer between the user's intended actions and the actual actions performed by nodes (e.g., master node 16 and/or compute nodes 18) of HPC cluster 10. The "srun" command represents, at least in part, a command to execute a parallel job in HPC cluster 10. The "srun" command is a command that prompts SLURM to allocate resources and run a command or script.

Instead of communicating directly with master node 16, obfuscation computing system 12 may pass the "srun" command through code obfuscation engine 62 before the "srun" command is provisioned and run, if obfuscation computing system 12 determines that an unprivileged or untrusted user generated the "srun" command. By building an interface between SLURM behavior and the user, implemented by obfuscation computing system 12, it becomes possible to not only control how information flows once it reaches master node 16 and/or compute nodes 18, but also how information is displayed to a user (e.g., a user of user computing systems 40).

In accordance with aspects of this disclosure, obfuscation computing system 12 may not invoke code obfuscation engine 62 if obfuscation computing system 12 determines that a trusted user originated the "srun" command. In these scenarios, obfuscation computing system 12 may forward the "srun" command in unaltered form and format to nodes 16, 18. Again, obfuscation computing system 12 may discern the status of the command-generating user (trusted versus untrusted status, in a simple binary implementation) based on a config file that obfuscation computing system generates and updates based on administrator-provided or maintainer-provided input received via interactive UI 56 implemented by user computing system 12.

The "srun" command, similar to many other SLURM commands, may have various parameter values (e.g., options) that are specified via user computing system 4. The values of these parameters may be associated with information about the particular "srun" command, such as information about the job to be run, how much memory to allocate, what kind and/or number of systems/nodes/resources to allocate, and the like. Some of the "srun" options or parameter values may be set using environment variables.

When command processing engine 40 receives the "srun" command from user computing systems 4, command processing engine 40 provides the "srun" command, along with any of the parameter values (e.g., input data), to code obfuscation engine 62 of obfuscation engine 48. Code obfuscation engine 62 receives the "srun" command as input and passes on an obfuscated version of the "srun" command (if the generating user is listed as untrusted in the config file) or an unaltered version of the "srun" command (if the generating user is listed as trusted in the config file) to the HPC system comprising master node 16 and compute nodes 18. In some examples of the originating user being untrusted, code obfuscation engine 62 may translate the received "srun" command into an obfuscated "srun" command that is executable by master node 16 and/or compute nodes 18. If obfuscation computing system 12 forwards the "srun" command in unaltered form to nodes 16, 18 (in response to the originating user being listed as trusted in the config file), the "srun" command is executable in its current form by master node 16 and/or compute nodes 18.

While the obfuscated "srun" command generated by code obfuscation engine 62 in the case of untrusted command-originating users may still appear to an interpreted by nodes 16, 18 as an "srun" command, the obfuscated "srun" command may have a different format and/or or have different input parameter values than the original "srun" command received from command processing engine 40. For example, if the original "srun" command had two specific input parameter values, code obfuscation engine 62 may obfuscate these input parameter values to generate an obfuscated "srun" command that has one or more different, obfuscated input parameter values as compared to the parameter values included in the original "srun" command.

Code obfuscation engine 62 may use SLURM obfuscation policies 58 to determine how to obfuscate the input parameter values in the case of the command-originating user being untrusted. SLURM obfuscation policies 58 are also customizable, such that the way in which code obfuscation engine 62 obfuscates the exact same command or data may be different depending on the rules specified by SLURM obfuscation policies 58. SLURM obfuscation policies 58 may also set forth the processes to be implemented in the case of the command-originating user being a trusted user, such as policy to forward the "srun" command in unaltered form, to cache and forward the unaltered "srun" command, to forward the unaltered version and cache an obfuscated version of the "srun" command for future use in case of a user reclassification as untrusted, etc.

Thus, in the example of FIG. 3, code obfuscation engine 62 may utilize SLURM obfuscation policies 58 to determine how to create the respective version "srun" command from the original "srun" command received from command processing engine 40 for forwarding. For instance, SLURM obfuscation policies 58 may include a rule specifying how code obfuscation engine 62 is to modify input parameter values of an "srun" command in order to generate an obfuscated "srun" command in the case of untrusted command-generating users. In some cases of untrusted command-generating users, code obfuscation engine 62 may encrypt the input parameter values associated with the original "srun" command, based on obfuscation policies 50, to generate encrypted input parameter values for the obfuscated "srun" command.

Code obfuscation engine 62 may provide this obfuscated "srun" command for execution by master node 16 and/or compute nodes 18, rather than the original "srun" command, if the config file sets forth that the command-generating user is untrusted. The obfuscated "srun" command, which includes or is otherwise associated with obfuscated data (e.g., obfuscated parameter values), may be referred to as an obfuscated code. Upon execution of the obfuscated "srun" command by, such as by one or more of compute nodes 18, code obfuscation engine 62 may receive obfuscated response data for the obfuscated "srun" command. This obfuscated response data may include output data associated with the obfuscated "srun" command.

Prior to passing information back to command processing engine 40, code obfuscation engine 62 may, in some cases, deobfuscate the obfuscated response data. For instance, code obfuscation engine 62 may utilize SLURM obfuscation policies 58 to determine how to deobfuscate the obfuscated response data. Continuing from the example above, if code obfuscation engine 62 had previously generated the obfuscated "srun" command by obfuscating the input parameter values associated with the original "srun" command (based on the command-generating user being classified as untrusted), code obfuscation engine 62 may subsequently deobfuscate the output data included in the obfuscated response data received from, e.g., compute nodes 18.

In one example of the original "srun" command having been generated by an untrusted user, code obfuscation engine 62 may use SLURM obfuscation policies 58 to translate the obfuscated response data, including any obfuscated output data, into different output values, thereby creating deobfuscated response data. As another example, code obfuscation engine 62 may use SLURM obfuscation policies 58 to decrypt any obfuscated output data received from compute nodes 18, thereby generating deobfuscated response data.

In some cases, obfuscation and deobfuscation rules specified by SLURM obfuscation policies 58 may be associated with each other. For instance, if code obfuscation engine 62 uses a first obfuscation rule in generating an obfuscated command (e.g., obfuscated "srun" command), code obfuscation engine 62 may use a first deobfuscation rule in generating deobfuscated response data that is responsive to the obfuscated command executed by compute nodes 18, where the first deobfuscation rule (e.g., decryption rule) corresponds to the first obfuscation rule (e.g., encryption rule) that was previously used to obfuscate the incoming command data. That is, corresponding obfuscation and deobfuscation rules may represent reciprocal processes, in terms of the end result produced and/or in terms of the operation sets being executed. In such fashion, SLURM obfuscation policies 58 may map certain obfuscation rules or policies to corresponding deobfuscation rules or policies that are implemented by obfuscation engine 48, including both code obfuscation engine 62 and system obfuscation engine 64.

The code obfuscation performed by code obfuscation engine 62 not only makes debugging the HPC code more difficult, but it also changes the behavior of devices executing the code to accept obfuscated data (e.g., as input parameter values). Obfuscated data is then introduced to HPC cluster 10, allowing the obfuscated code to perform, e.g., the homomorphic equivalent of the original calculations with minimal computational overhead or impact on efficiency. Through implementation of code-level obfuscation, code obfuscation engine 62 may hide user data and algorithms associated with commands being processed by master node 16 and/or compute nodes 18 from other users. This may be achieved by obfuscating user code and data before running the user code and data on the target cluster of nodes (e.g., compute nodes 18). Code obfuscation engine 62 may comprise an intermediate interface between command processing engine 40 and master node 16/compute nodes 18, which interpret user requests and passes obfuscated version of them on to one or more nodes in HPC cluster 10.

There are other potential benefits to providing an intermediate interface for SLURM actions, as provided by obfuscation computing system 12. Users of HPC cluster 10 (e.g., users of user computing systems 4) do not necessarily have to learn a new interface, even though the underlying behavior of their actions will change. It also becomes possible to implement stricter access controls for unprivileged or untrusted users. For example, users can view information about resource availability via interactive UI 56 by causing user computing system 4 to send an "sinfo" SLURM command to HPC cluster 10. The standard response to a non-obfuscated "sinfo" command may provide details on specific hardware usage within HPC cluster 10, potentially indicating a class of problem that is being worked on by other users.

However, obfuscation computing system 12 may implement the techniques of this disclosure to change, omit, or otherwise obfuscate SLURM commands and the corresponding responses to such commands if obfuscation computing system 12 determines that the command-generating user is classified as unprivileged/untrusted. In these scenarios, obfuscation computing system 12 raises the bar for casual users trying to obtain inside information for HPC cluster 10. In addition, for other types of potential attacks or compromises on data confidentiality, obfuscation computing system 12 may also implement system-level obfuscation through use of obfuscation engine 48, as will be described in further detail below.

The command interpretation layer provided by command processing engine 40 and/or obfuscation engine 48 (by invoking code obfuscation engine 62) may augment the CLI with additional monitoring commands. An important part of HPC cybersecurity is the ability to monitor system performance and gather diagnostic information about HPC cluster 10. Suspicious activities can be identified through the use of monitoring tools that have sufficient granularity. Obfuscation computing system 12 may be configured to perform such monitoring and diagnostic operations. Obfuscation computing system 12 may act as a central source of cluster behavior, allowing a high level of diagnostic detail to be obtained.

As one example, command processing engine 40 may implement a command that may be invoked by user computing system 4 to provide processor usage (e.g., current, historical) across compute nodes 18 in HPC cluster 10. Command processing engine 40 may support one or more additional commands that provide information about monitored system performance and diagnostic information for HPC cluster 10. Furthermore, command processing engine 40 may support one or more commands associated with operation of obfuscation modules, such as code obfuscation engine 62 and/or obfuscation engine 48, as well as with SLURM obfuscation policies 58. These commands may only be accessible to privileged or authorized users (e.g., administrators) of HPC cluster 10.

Through the use of such commands with HPC cluster 10, a privileged or authorized user may obtain information about the status and operation associated with obfuscation engine 48. In addition, the user may use such commands to view and/or modify the rules or policies contained in SLURM obfuscation policies 58, which are accessed and consulted by obfuscation engine 48 during operation. In such fashion, a privileged or authorized user may effectively modify the operation of obfuscation engine 48 during execution of commands or transport of data within HPC cluster 10.

According to the implementation shown in FIG. 3, obfuscation engine 48 also includes system obfuscation engine 64. When invoked by obfuscation engine 48 (e.g., in response to determining that a command-originating user does not have or does not yet have privileged status), system obfuscation engine 64 provides system-level obfuscation for HPC cluster 10. System obfuscation engine 64 may be configured to obfuscate system data and network configuration and/or traffic data, among other things. In such fashion, system obfuscation engine 64 may, in some cases, control the configuration of and data flow through HPC cluster 10, including master node 16 and compute nodes 18, and may alter the behavior of HPC cluster 10 on a system-wide basis. By obfuscating system-level and/or configuration-level information, system obfuscation engine 64 may obfuscate interactions between nodes, such as mater node 16 and/or compute nodes 18, and effectively restrict user access to any computational metadata in HPC cluster 10 while potentially having minimal-to-no impact on computational efficiency within HCP cluster 10.

Within the context of the non-limiting example illustrated in FIG. 3, obfuscation engine 48, as well as the other modules or components of obfuscation computing system 12, may leverage the SLURM plugin architecture to modify various functionality of SLURM within HPC cluster 10. Obfuscation engine 48 may support many different obfuscation techniques, and, in cases of data associated with communications received from untrusted users, may change the behavior of task scheduling, interconnection fabric, resource selection, logging, and/or authentication (e.g., for SLURM) to behave in unpredictable ways by, e.g., masking metadata that may compromise the security of the user or of HPC cluster 10 in general.

By providing an intermediate control source, system obfuscation engine 64, and obfuscation engine 48 in general, may gain granular control over daemons or processes executed by master node 16 and/or compute nodes 18, the interactions between such daemons or processes, and how resources are allocated in HPC cluster 10, because obfuscation engine 48 may serve as an intermediate redirection layer between master node 16 and compute nodes 18. By redirecting resource allocation tasks back through obfuscation engine 48, including obfuscation engine 48, it becomes possible to implement various management techniques (e.g., randomization techniques) on compute resources such as compute nodes 18, as described in more detail below.

As one non-limiting example, system obfuscation engine 64 may, based on one or more of SLURM obfuscation policies 58, implement an obfuscation technique for randomized task scheduling of tasks that are performed by compute nodes 18. Task scheduling is generally understood as the act of determining an order of resource allocation (e.g., allocation of compute nodes 18) for task execution. Without the use of obfuscation engine 48, a task scheduler (e.g., master node 16) may use a backfill algorithm that determines resource allocation based on task priorities.

However, one security-relevant limitation of such a backfill algorithm is predictability. A backfill algorithm may also require master node 16 to consider all other running jobs or tasks in order to assign resources, which may add computational overhead to the process. As such, obfuscation computing system 12 may use the backfill functionalities if obfuscation computing system 12 verifies trusted status with respect to an original command-originating or request-originating user, while invoking code obfuscation engine 62 and/or system obfuscation engine 64 in instances in which the user has not been verified as a privileged/trusted user.

Through the use of system obfuscation engine 64, which serves as an intermediate redirection layer between master node 16 and compute nodes 18, HPC cluster 10 may implement a randomized scheduler that is less predictable and that potentially does not add as much computational overhead. Users may be unable to anticipate which resources will be allocated to which job or task, preserving computational integrity. By using a random scheduler, obfuscation engine 48 may reduce computational overhead while maintaining comparable utilization to the backfill algorithm for scheduling tasks.

System obfuscation engine 64 may not necessarily account for task prioritization or all other running jobs in HPC cluster 10 in order to implement task randomization. Instead, system obfuscation engine 64 may utilize SLURM obfuscation policies 58 to determine one or more randomization algorithms to use in scheduling tasks for execution by allocated ones of compute nodes 18. For example, on each individual occasion that system obfuscation engine 64 needs to allocate one of compute nodes 18 for performing a job or task (or a portion thereof), system obfuscation engine 64 may randomly select one of compute nodes 18 independent of job or task priority, thereby making the behavior of HPC cluster 10, and task scheduling more generally, less predictable.

In effect, by implementing randomization, system obfuscation engine 64 may obfuscate the process that HPC cluster 10 uses for task scheduling and/or resource allocation. In some instances in which it is invoked by obfuscation engine 48 in response to detecting communications from an untrusted user, system obfuscation engine 64 may further obfuscate the task scheduling process, in some cases, by randomizing or otherwise altering (e.g., based on one or more of SLURM obfuscation policies 58) the time scheduling of tasks that is otherwise typically performed by master node 16, which may make the process further obfuscated to a user/device that may attempt to snoop into the activities of HPC cluster 10.

In other non-limiting examples of invocation by obfuscation engine 48 based on detecting the untrusted status of a communication-originating user, system obfuscation engine 64 may utilize SLURM obfuscation policies 58 to determine other algorithms, separate from randomization algorithms, to use in scheduling tasks for execution by allocated ones of compute nodes 18. For example, on each occasion that system obfuscation engine 64 needs to allocate one of compute nodes 18 for performing a job or task (or a portion thereof), system obfuscation engine 64 may select one of compute nodes 18 by taking into account the current availability and/or utilization of each of compute nodes 18.

For example, system obfuscation engine 64 may implement one or more techniques to determine which of compute nodes 18 have current availability and/or bandwidth for task processing, and may also, in some cases, determine which of compute nodes are currently underutilized within the set of compute nodes 18. Based on such determinations, system obfuscation engine 64 may select a particular one of compute nodes 18 for task processing.

In addition to modifying functionality associated with task scheduling and/or resource allocation, system obfuscation engine 64 may also provide system-level obfuscation functionality associated with networking, logging, and/or authentication. For example, with respect to networking, system obfuscation engine 64 may obfuscate network traffic that is transmitted to or received by master node 16 and/or compute nodes 18.

By obfuscating network packets, a user or other entity attempting to snoop into the data flow of HPC cluster 10 may have a much more difficult time trying to discover the content (e.g., encrypted content) or originators (e.g., originating sources) of the packets. In some cases of being invoked by obfuscation engine 48 based on determining that a communication-originating user does not have privileged or trusted status, system obfuscation engine 64 may use one or more encryption algorithms specified by SLURM obfuscation policies 58 to obfuscate or deobfuscate network traffic that flows in HPC cluster 10.

In some cases, when invoked, system obfuscation engine 64 may also obfuscate (e.g., encrypt) logging data that is processed or stored by HPC cluster 10, making it more difficult for a user to discern the functionality of HPC cluster 10 based on the content of log data or messages. In many cases, log data may provide a glimpse into various operations that are performed by HPC cluster 10, or into the general state of HPC cluster 10. However, by obfuscating such log data, system obfuscation engine 64 may add another layer of obfuscation and unintelligibility and/or unpredictability into the system.

In some examples, when invoked by obfuscation engine 48, system obfuscation engine 64 may also obfuscate authentication data or procedures used by HPC cluster 10. For example, system obfuscation engine 64 may alter the process that is used for user authentication on HPC cluster 10. In some such cases, system obfuscation engine 64 may obfuscate the authentication data that is used or stored by HPC cluster 10, such that an unauthorized or unprivileged user, or a rogue device, or a malicious user, may have much more difficulty in gleaning information about the authentication process or stored records.

In addition, upon being invoked by obfuscation engine 48 based on the untrusted status of a communication-originating user, system obfuscation engine 64 may obfuscate configuration information that is transmitted or otherwise processed in HPC cluster 10. In various cases, obfuscation computing system 12 and/or master node 16 may configure one or more of compute nodes 18 (e.g., during initialization or at runtime). For example, obfuscation computing system 12 and/or master node 16 may configure one or more of resources provided by compute nodes 18 that are to be used in task execution. In these cases, system obfuscation engine 64 may be configured to obfuscate, if invoked, such configuration operations in setting up and managing compute nodes 18. In addition, obfuscation computing system 12 may obfuscate (e.g., encrypt) any configuration data that is exchanged with master node 16 and/or compute nodes 18 as part of the configuration process.

As described previously, SLURM obfuscation policies 58 may be fully or at least partially customizable, such as by a system administrator or maintainer via input provided through interactive UI 56. Thus, obfuscation computing system 12 may change (e.g., based on user/administrator input) a first group of SLURM obfuscation policies 58 that are used by code obfuscation engine 62 and system obfuscation engine 64 over time. For example, at any point in time, a user may customize SLURM obfuscation policies 58 to alter the way in which code obfuscation engine 62 obfuscates or deobfuscates commands or associated data. Prior to such customization, obfuscation computing system 12 may have obfuscated data associated with incoming commands received from command processing engine 40 based on a first group of SLURM obfuscation policies 58 in order to generate obfuscated commands that are sent to master node 16 and/or compute nodes 18.

However, upon user customization of the first group of SLURM obfuscation policies 58, obfuscation computing system 12 may subsequently obfuscate data associated with new incoming commands received from command processing engine 40 based on the first modified group of SLURM obfuscation policies 58, which may alter the way in which obfuscation computing system 12 obfuscates command data that is sent to master node 16 and/or compute nodes 18, introducing a level of change and/or unpredictability into HPC cluster 10.

Again, code obfuscation module 46 may utilize these ones of SLURM obfuscation policies 58 to implement its code-level functionality. SLURM obfuscation policies 58 may also include one or more different policies associated with system obfuscation-level functionality (e.g., policies associated with task scheduling, networking/interconnections, resource selection, logging, and/or authentication). System obfuscation engine 64 may utilize these ones of SLURM obfuscation policies 58 to implement its system-level obfuscation functionality. SLURM obfuscation policies 58 are customizable and may be modified by, e.g., an administrator of computing platform 10, to change the operational behavior of obfuscation engine 48.

Similarly, a user may customize a second group of SLURM obfuscation policies 58 to alter the way in which obfuscation engine 48 obfuscates task scheduling, resource allocation, logging, networking, and/or authentication in HPC cluster 10. By customizing or changing SLURM obfuscation policies 58 over time, obfuscation computing system 12 introduces even more change and/or unpredictability into HPC cluster 10, making it difficult for users to gain insight into any specific or unchanging obfuscation techniques that may be used.

Examples of the processing circuitry of user computing system 4 and/or obfuscation computing system 12 include, but are not limited to, one or more digital signal processors (DSPs), general purpose microprocessors, application specific integrated circuits (ASICs), field programmable logic arrays (FPGAs), fixed function circuitry, programmable processing circuitry, various combinations of fixed function with programmable processing circuitry, or other equivalent integrated circuitry or discrete logic circuitry. The processing circuitry of obfuscation computing system 12 may be a central processing unit (CPU). Some components of computing system 10 may be specialized hardware, such as integrated and/or discrete logic circuitry that provide specific functionalities, and optionally, that implement parallel processing capabilities with respect to the processing circuitry of obfuscation computing system 12.

SLURM obfuscation policies 58 and/or other data discussed with respect to FIG. 3 may be stored to one or more memory or data storage devices or components of obfuscation computing system 12. One or more storage devices of obfuscation computing system 12 are configured to store information within obfuscation computing system 12 before, during, or after operation. The storage devices of obfuscation computing system 12, in some examples, are collectively described as a computer-readable storage medium. In some examples, a storage device of obfuscation computing system 12 include a temporary memory, meaning that a primary purpose of the respective storage device is not long-term storage.

One or more of the storage devices of obfuscation computing system 12, in some examples, are described as a volatile memory, meaning that these particular storage devices do not maintain stored contents when the computer is turned off. Examples of volatile memories include random access memories (RAM), dynamic random access memories (DRAM), static random access memories (SRAM), and other forms of volatile memories.

In some examples, one or more storage devices of obfuscation computing system 12 are used to store program instructions for execution by the processing circuitry of obfuscation computing system 12. The respective storage device is, in some examples, used by software or applications running on obfuscation computing system 12 to temporarily store information during program execution. As described above, the storage devices of obfuscation computing system 12, in some examples, include one or more computer-readable storage media. The storage devices of obfuscation computing system 12 may be configured to store larger amounts of information than volatile memory.

The storage devices may further be configured for long-term storage of information. In some examples, the storage devices of obfuscation computing system 12 include non-volatile storage elements. Examples of such non-volatile storage elements include solid state drives (SSDs), magnetic hard discs, optical discs, floppy discs, flash memories (e.g., including removable devices connectable via USB®), or forms of electrically programmable memories (EPROM) or electrically erasable and programmable (EEPROM) memories.

Figure 4:
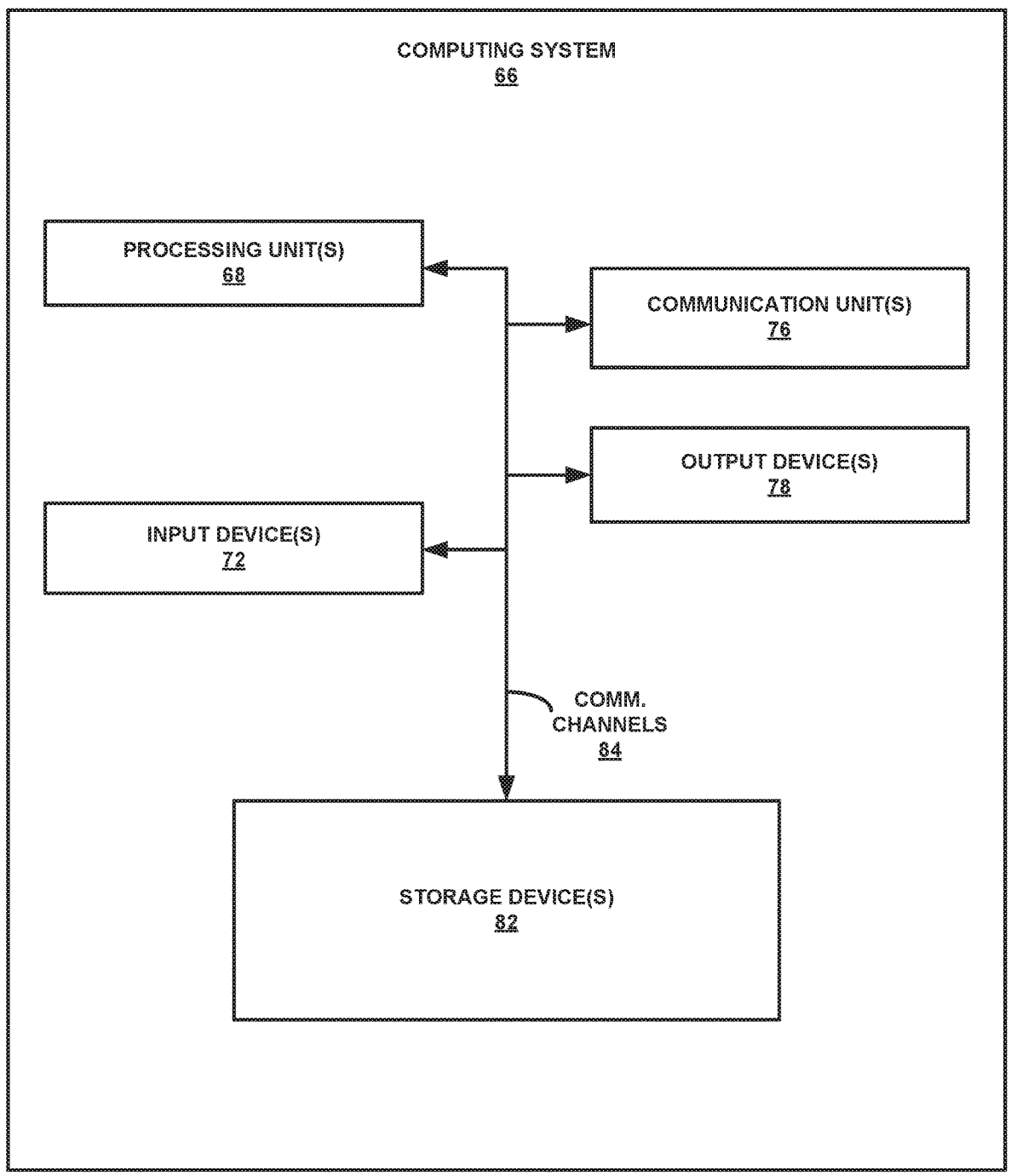
FIG. 4 is a block diagram illustrating further details of an example computing system, such as one or more of the computing systems shown in FIGS. 1-3, in accordance with one or more aspects of the present disclosure.

FIG. 4 is a block diagram illustrating further details of an example computing system 66, such as one or more of the computing systems shown in FIGS. 1-3, in accordance with one or more aspects of the present disclosure. For example, computing system 66 may be an example of one of user computing system 4, an example of obfuscation computing system 12 in computing platform 10, and/or obfuscation system 22 in computing platform 20. FIG. 4 illustrates only one particular example of computing system 66, and many other examples of computing system 66 may be used in other instances and may include a subset of the components shown, or may include additional components not shown, in FIG. 4.

As shown in the example of FIG. 4, computing system 66 includes one or more processing units 68, one or more input devices 72, one or more communication units 76, one or more output devices 78, and one or more storage devices 82. In some examples, computing system 120 may not include input devices 72 and/or output devices 78. Communication channels 84 may interconnect each of the components 68, 72, 76, 78, and 82 for inter-component communications (physically, communicatively, and/or operatively). In some examples, communication channels 84 may include a system bus, a network connection, an inter-process communication data structure, or any other method for communicating data between hardware and/or software.

One or more input devices 72 of computing system 66 may receive input. Examples of input are tactile, audio, and video input. Examples of input devices 72 include a presence-sensitive screen, touch-sensitive screen, mouse, keyboard, voice responsive system, video camera, microphone or any other type of device for detecting input from a human or machine.

One or more output devices 78 of computing system 66 may generate output. Examples of output are tactile, audio, and video output. Examples of output devices 78 include a presence-sensitive screen, sound card, video graphics adapter card, speaker, cathode ray tube (CRT) monitor, liquid crystal display (LCD), or any other type of device for generating output to a human or machine. Output devices 78 may include display devices such as cathode ray tube (CRT) monitor, liquid crystal display (LCD), or any other type of device for generating tactile, audio, and/or visual output.

One or more communication units 76 of computing system 66 may communicate with one or more other computing systems or devices via one or more networks by transmitting and/or receiving network signals on the one or more networks. Examples of communication units 76 include a network interface card (e.g. such as an Ethernet card), an optical transceiver, a radio frequency transceiver, or any other type of device that can send and/or receive information, such as through a wired or wireless network. Other examples of communication units 76 may include short wave radios, cellular data radios, wireless Ethernet network radios, as well as universal serial bus (USB) controllers. Communication units 76 may provide wired and/or wireless communication.

One or more storage devices 82 within computing system 66 may store information for processing during operation of computing system 66 (e.g., computing system 66 may store data accessed by one or more modules, processes, applications, or the like during execution at computing system 66). In some examples, storage devices 82 on computing system 66 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 82, in some examples, also include one or more computer-readable storage media. Storage devices 82 may be configured to store larger amounts of information than volatile memory. Storage devices 82 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 82 may store program instructions and/or data associated with one or more software/firmware elements or modules.

For example, when computing system 66 comprises an example of obfuscation computing system 12 shown in FIG. 2, storage devices 82 may store obfuscation policies 50. In addition, storage devices 82 may store instructions and/or data associated with command processing engine 40, monitoring module 41, and cybersecurity engines 44 shown in FIG. 2.

Storage devices 82 also store instructions and/or data associated with an operating system, which may be used by computing system 66 during operation. As described herein, computing system 66 may utilize one or more different operating systems (e.g., FreeBSD, Linux).

Computing system 66 further includes one or more processing units 68 that may implement functionality and/or execute instructions within computing system 66. For example, processing units 68 may receive and execute instructions stored by storage devices 82 that execute the functionality of the elements and/or modules described herein. These instructions executed by processing units 68 may cause computing system 66 to store information within storage devices 82 during program execution. Processing units 68 may also execute instructions of the operating system to perform one or more operations described herein.

Figure 5:
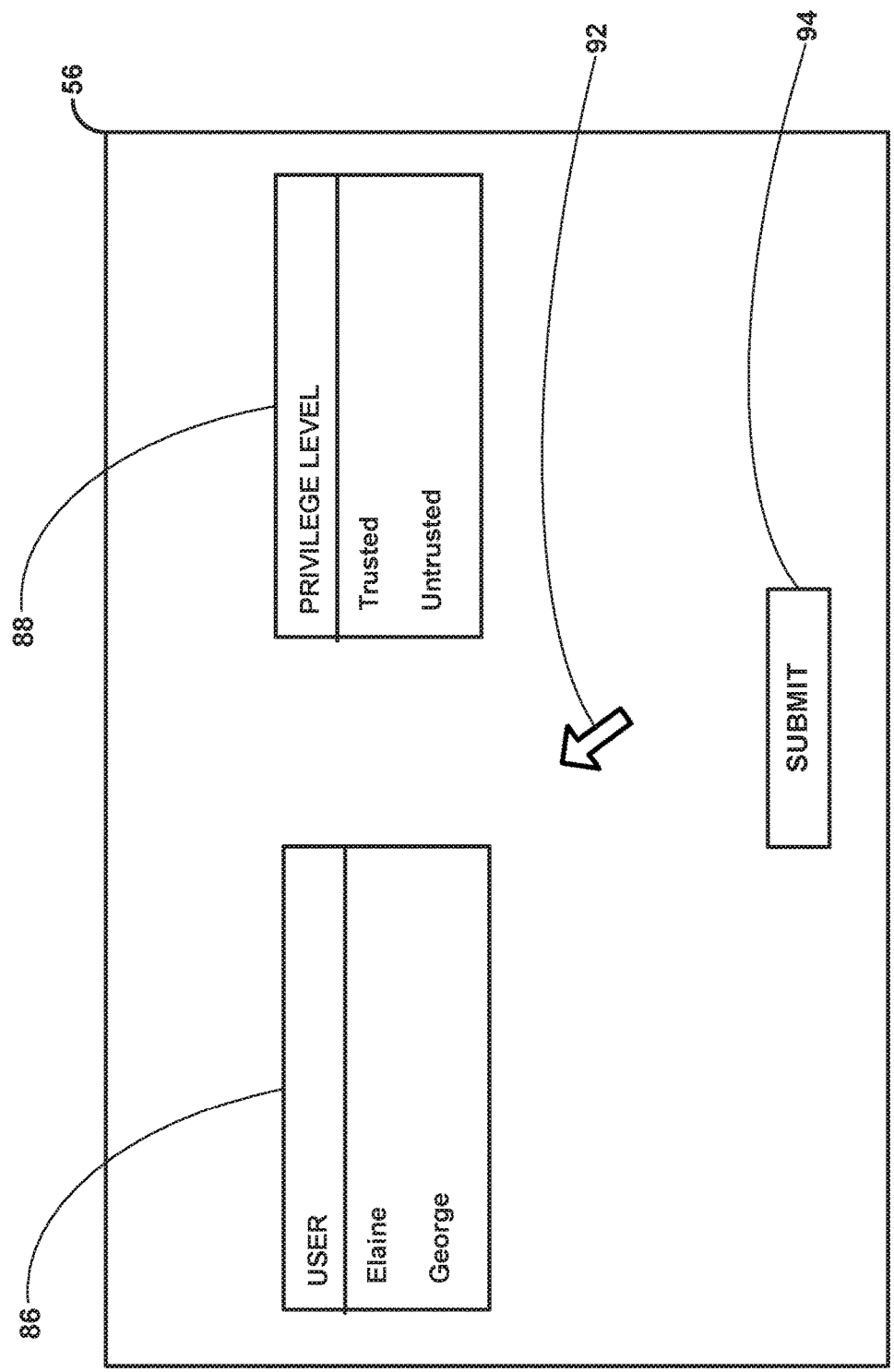
FIG. 5 is a conceptual diagram illustrating one non-limiting example of the interactive user interface shown in FIGS. 2 and 3.

FIG. 5 is a conceptual diagram illustrating one non-limiting example of interactive UI 56 shown in FIGS. 2 and 3. Various devices of this disclosure may generate, output, and accept input via interactive UI 56, including, but not limited to, user computing system 4, user computing system 8, computing system 66, and various others. Interactive UI 56 is described herein as being operated by user computing system 4, as an example.

In the example of FIG. 5, user computing system 4 generates interactive UI 56 to include two dropdown menus, namely, user menu 86 and privilege level menu 88 (collectively, "dropdown menus 86 and 88"). A system administrator or system maintainer of computing platform 10 may provide input to user computing system 4 using the various UI elements shown in interactive UI 56. For example, the system administrator/maintainer may use interactive UI 56 to set privilege levels on a user-by-user basis with respect to accessing and operating data pertinent to computing platform 10, in accordance with various aspects of this disclosure.

Both of dropdown menus 86 and 88 are shown in dropped state in FIG. 5, for ease of illustration and discussion purposes only. It will be appreciated that, in operation, the system administrator/maintainer may drop one of dropdown menus at a time, such as by placing cursor 92 over a portion of the particular dropdown menu and providing a click input via a mouse. While the operation of interactive UI 56 is described herein with respect to using a mouse and desktop or laptop computer, it will be appreciated that interactive UI 56 may also be operated via finger- or stylus-provided input using a touchscreen or presence-sensitive input/output device as well, such as those generally integrated into tablet computers and smartphones.

To select a particular user for whom to assign privilege information, the system administrator/maintainer may place cursor 92 over one of the users listed in user menu 86, and click on the user's name. User menu 86 is illustrated as having only two entries in FIG. 5, for the purposes of simplicity, and larger (or smaller) user lists are consistent with the techniques of this disclosure.

Upon selecting one of the users ("Elaine" or "George") for whom to assign a privilege level, the system administrator/maintainer may place cursor 92 over one of the privilege level options listed in privilege level menu 88. The privilege level selection is shown in FIG. 5 using a simple two-level hierarchy for purposes of simplicity, and more granular hierarchies (e.g., with a greater number of privilege level options than two) are consistent with the techniques of this disclosure.

Upon completing each respective user-privilege level mapping using dropdown menus 86 and 88, the system administrator/maintainer may submit the respective mapping to user computing system 4 by placing cursor 92 over submit button 94 and providing a click input. In turn, user computing system 4 may update a config file that sets forth the individual user-privilege level mappings available to user computing system 4 with respect to computing platform 10.

FIG. 5 is described herein with respect to a use case scenario in which the system administrator/maintainer assigns user "Elaine" a "trusted" privilege level, and assigns user "George" an "untrusted" privilege level, using dropdown menus 86 and 88. The config file that user computing system 4 generates, at the time that only these two user-privilege level mappings are available, may be represented by the code presented below.

```
{
    "users":
    [
        {"name": "elaine", "privilege": 1},
        {"name": "george", "privilege": 2}
    ],
    "privlege_levels":
    [{
        "level": 1,
        "behaviors": [{
            "command": "sinfo",
            "input_func": "no_change",
            "output_func": "no_change"
        }, {
            "command": "srun",
            "input_func": "no_change",
            "output_func": "no_change"
        }]
    }, {
        "level": 2,
        "behaviors": {
            "command": "squeue",
            "input_func": "no_change",
            "output_func": "no_change"
        }, {
            "command": "srun",
            "input_func": "no_change",
            "output_func": "no_change"
        }]
    }]
}
```

FIG. 6 is a conceptual diagram illustrating an activity monitoring interface (traffic monitor 96) of this disclosure. It will be appreciated that the activity monitoring capabilities of this disclosure may be presented in various formats, and that traffic monitor 96 represents only one non-limiting example of an interface via which the systems of this disclosure present information describing traffic over computing platforms 10, 20. In the example of traffic monitor 96, user computing systems 4, 8 output data indicative of the origination time of particular communications, the source and intended destination of each communication, a privilege level of the source (e.g., the user operating the source device), and traffic information describing the particular communication.

In the example of traffic monitor 96, user computing systems 4, 8 utilize a multi-tiered privilege hierarchy. That is, in this particular example, user computing systems 4, 8 assign privilege levels corresponding to a trusted level, and a multitude of unprivileged levels. The various unprivileged levels represent different strata or classifications of user/device access authorities with respect to the resources of computing platforms 10, 20. For example, "unprivileged level 1" may afford a greater amount of access rights than afforded by "unprivileged level 2," which in turn may afford a greater amount of access rights than "unprivileged level 3."

Traffic monitor also provides a description of each communication by listing the protocol to which the respective communication conforms, and a description of the particular message under that protocol. The origination time is expressed in absolute seconds after the beginning of monitoring, in the example of traffic monitor. In the particular use case scenario illustrated in FIG. 6, three users of the lowest privilege level ("unprivileged level 3") have attempted to access one of the designated honeypot nodes (decoy nodes 52 of FIG. 2), and may thereby instigate the cybersecurity measures implemented by user computing systems 4, 8 as described above.

Figure 7:
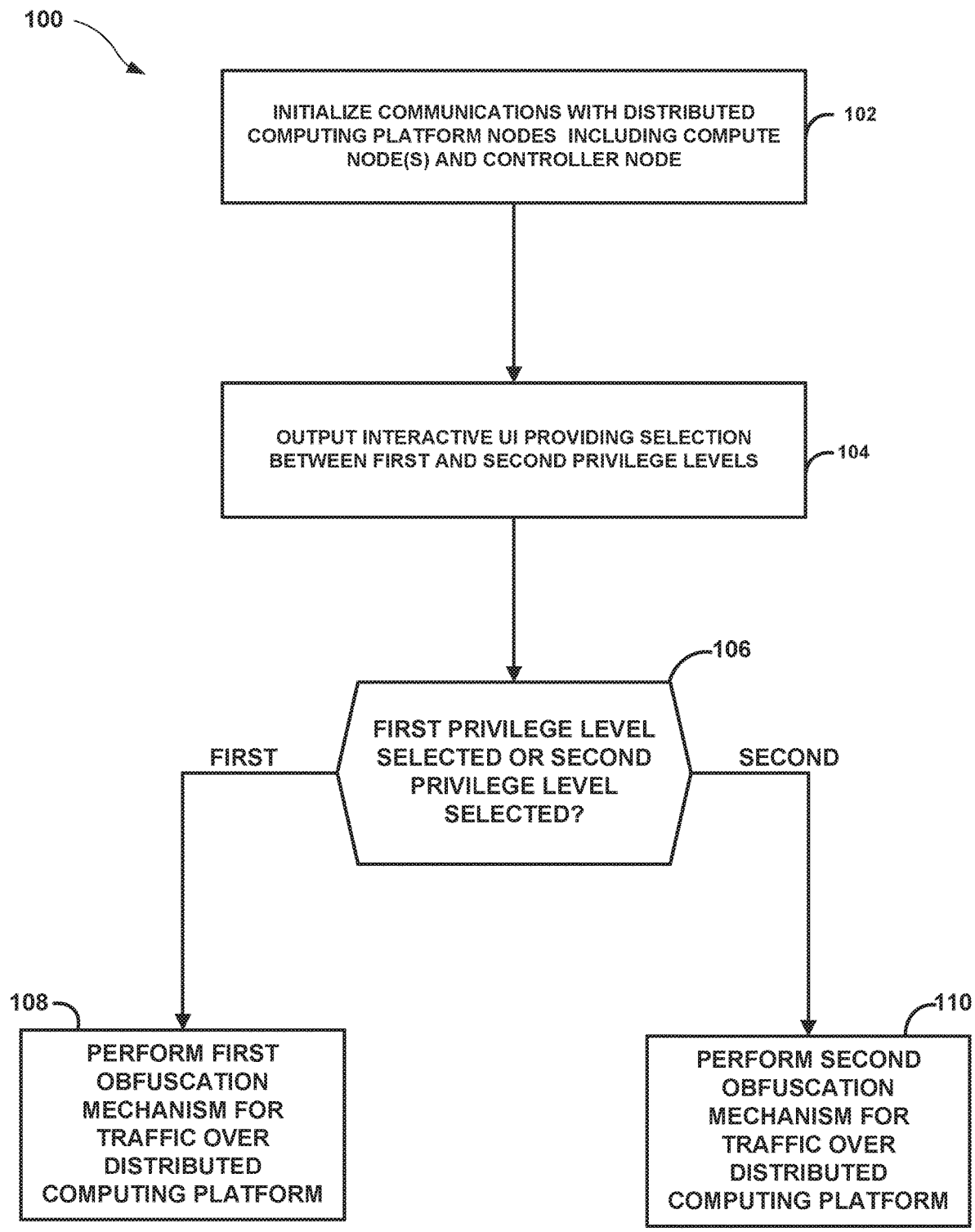
FIG. 7 is a flow diagram illustrating an example process that a computing device or system may perform, in accordance with the aspects of this disclosure.

FIG. 7 is a flow diagram illustrating a process 100 that a computing device or system may perform, in accordance with the aspects of this disclosure. Process 100 is described herein as being performed by obfuscation computing system 12 of FIGS. 1-3, and more specifically, by processing circuitry thereof, as an example. However, it will be understood that various devices or systems described herein may perform process 100, either individually, or as part of a larger process. Process 100 may begin with processing circuitry of obfuscation computing system 12 initializing communications with distributed computing platform nodes (102). The distributed computing platform nodes include one or more compute nodes that provide resources in the distributed computing platform. The distributed computing platform nodes further include a controller node that performs resource management of the above-mentioned resources in the distributed computing platform. In these examples, obfuscation computing system 12 serves as an intermediary between the controller node and the compute nodes.

The processing circuitry of obfuscation computing system 12 is further configured to output an interactive user interface (UI) providing a selection between a first privilege level and a second privilege level (104). In turn, the processing circuitry of obfuscation computing system 12 may receive data indicating a selection between the first privilege level and the second privilege level. The processing circuitry of obfuscation computing system 12 may determine whether the first privilege level was selected or the second privilege level was selected (decision block 106).

If the processing circuitry of obfuscation computing system 12 determines that the first privilege level was selected ("FIRST" branch of decision block 106), the processing circuitry of obfuscation computing system 12 performs a first obfuscation mechanism for traffic (e.g. digital data traffic) over the distributed computing platform (108). If the processing circuitry of obfuscation computing system 12 determines that the second privilege level was selected ("SECOND" branch of decision block 106), the processing circuitry of obfuscation computing system 12 performs a second obfuscation mechanism for the traffic over the distributed computing platform (110).

In some examples, the first privilege level is associated with privileged users of the user computing system. In these examples, to perform the first obfuscation mechanism, the processing circuitry of obfuscation computing system 12 forwards the digital traffic between the user computing system and the plurality of nodes in unaltered form. In some examples, obfuscation computing system 12 further includes a network interface in communication with the processing circuitry. In these examples, to forward the digital traffic, the processing circuitry of obfuscation computing system 12 forwards the digital traffic via the network interface.

In some examples, the second privilege level is associated with unprivileged users of the user computing system. In these examples, to perform the second obfuscation mechanism, the processing circuitry of obfuscation computing system 12 applies code-level obfuscation to the digital traffic between the user computing system and the plurality of nodes in unaltered form. In some examples, to apply the code-level obfuscation, the processing circuitry of obfuscation computing system 12 obfuscates data associated with one or more received from the user computing system to generate one or more obfuscated commands, and to send the one or more obfuscated commands to at least one of the plurality of nodes in the distributed computing platform. In some examples, the processing circuitry of obfuscation computing system 12 receives, via the interactive UI, an indication of the selection. In some examples, the obfuscation system further includes an input device. In these examples, to receive the indication of the selection, the processing circuitry is configured to receive the indication of the selection via the input device and via the interactive UI. In some examples, the distributed computing platform comprises a distributed high-performance computing cluster. The user computing system may, in some cases, be external to the distributed computing platform.

In some examples, the processing circuitry of obfuscation computing system designates at least one node of a plurality of nodes as a decoy node, and may detect a portion of the digital traffic that requests access to the decoy node. Based on the portion of the digital traffic requesting the access to the decoy node, the processing circuitry of obfuscation computing system 12 may determine that a user identity requesting the access to the decoy node is a malicious user identity, and may initiate a tripwire functionality with respect to the malicious user identity. In some examples, to initiate the tripwire functionality with respect to the malicious user identity, the processing circuitry of obfuscation computing system 12 updates the interactive UI identifying the malicious user identity. In some examples, to designate the at least one node as the decoy node, the processing circuitry of obfuscation computing system 12 determines that the at least one decoy node is dormant with respect to activity over the distributed computing platform, and selects the at least one node to be designated as the decoy node based on the at least one node being dormant with respect to the activity over the distributed computing platform.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically programmable memory (EPROM), electrically erasable and programmable memory (EEPROM), compact-disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), processing circuitry (such as fixed function circuitry, programmable processing circuitry, or any combination of fixed function circuitry and programmable processing circuitry) or other equivalent integrated logic circuitry, or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    initializing, by an obfuscation computing system, communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the obfuscation computing system serves as an intermediary between the controller node and the one or more compute nodes;
    outputting, by the obfuscation computing system, an interactive user interface (UI) providing a selection between at least a first privilege level and a second privilege level; and
    performing, by the obfuscation computing system, an obfuscation mechanism based on a privilege level, including:
    based on the selection being associated with the first privilege level, performing a first obfuscation mechanism for the distributed computing platform to obfuscate digital traffic between a user computing system and the plurality of nodes, and
    based on the selection being associated with the second privilege level, performing a second obfuscation mechanism for the distributed computing platform to obfuscate digital traffic between the user computing system and the plurality of nodes, and wherein performing the second obfuscation mechanism comprises performing obfuscating operations on unobfuscated information that is received from the user computing system and then sent as obfuscated information to the controller or the one or more compute nodes, and performing reciprocal operations on obfuscated response information that is received from the controller or the one or more compute nodes and then sent as obfuscated response information to the user computing system, wherein the first privilege level is associated with privileged users of the user computing system and the second privilege level is associated with unprivileged users of the user computing system.

2. The method of claim 1, wherein the first privilege level is associated with privileged users of the user computing system, and wherein performing the first obfuscation mechanism comprises forwarding the digital traffic between the user computing system and the plurality of nodes in unaltered form.

3. The method of claim 1, wherein the second privilege level is associated with unprivileged users of the user computing system, and wherein performing the second obfuscation mechanism comprises applying code-level obfuscation to the digital traffic between the user computing system and the plurality of nodes in unaltered form.

4. The method of claim 3, wherein applying the code-level obfuscation comprises:
    obfuscating data associated with one or more received commands from the user computing system to generate one or more obfuscated commands; and
    sending the one or more obfuscated commands to at least one of the plurality of nodes in the distributed computing platform.

5. The method of claim 1, further comprising:
designating at least one node of the plurality of nodes as a decoy node;
detecting a portion of the digital traffic that requests access to the decoy node; and
based on the portion of the digital traffic requesting the access to the decoy node:
determining that a user identity requesting the access to the decoy node is a malicious user identity; and
initiating a tripwire functionality with respect to the malicious user identity.

6. The method of claim 5, wherein initiating the tripwire functionality with respect to the malicious user identity comprises updating the interactive UI identifying the malicious user identity.

7. The method of claim 5, wherein designating the at least one node as the decoy node comprises:
determining that the at least one decoy node is dormant with respect to activity over the distributed computing platform; and
selecting the at least one node to be designated as the decoy node based on the at least one node being dormant with respect to the activity over the distributed computing platform.

8. The method of claim 1, further comprising:
monitoring, by the obfuscation computing system, the digital traffic over the distributed computing platform; and
outputting, by the obfuscation computing system, via the interactive UI, information describing the monitored digital traffic.

9. An obfuscation system comprising:
a memory; and
processing circuitry in communication with the memory, the processing circuitry being configured to:
initialize communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the obfuscation system serves as an intermediary between the controller node and the one or more compute nodes;
output an interactive user interface (UT) providing a selection between at least a first privilege level and a second privilege level;
based on the selection being associated with the first privilege level, perform a first obfuscation mechanism for the distributed computing platform to obfuscate digital traffic between a user computing system and the plurality of nodes; and
based on the selection being associated with the second privilege level, perform a second obfuscation mechanism for the distributed computing platform to obfuscate digital traffic between the user computing system and the plurality of nodes, and wherein performing the second obfuscation mechanism comprises performing obfuscating operations on unobfuscated information that is received from the user computing system and then sent as obfuscated information to the controller or the one or more compute nodes, and performing reciprocal operations on obfuscated response information that is received from the controller or the one or more compute nodes and then sent as obfuscated response information to the user computing system, wherein the first privilege level is associated with privileged users of the user computing system and the second privilege level is associated with unprivileged users of the user computing system.

10. The obfuscation system of claim 9, wherein the first privilege level is associated with privileged users of the user computing system, and wherein to perform the first obfuscation mechanism, the processing circuitry is configured to forward the digital traffic between the user computing system and the plurality of nodes in unaltered form.

11. The obfuscation system of claim 10, further comprising a network interface in communication with the processing circuitry, wherein to forward the digital traffic, the processing circuitry is configured forward the digital traffic via the network interface.

12. The obfuscation system of claim 9, wherein the second privilege level is associated with unprivileged users of the user computing system, and wherein to perform the second obfuscation mechanism, the processing circuitry is configured to apply code-level obfuscation to the digital traffic between the user computing system and the plurality of nodes in unaltered form.

13. The obfuscation system of claim 12, wherein to apply the code-level obfuscation, the processing circuitry is configured to:
obfuscate data associated with one or more received from the user computing system to generate one or more obfuscated commands; and
send the one or more obfuscated commands to at least one of the plurality of nodes in the distributed computing platform.

14. The obfuscation system of claim 9, wherein the processing circuitry is further configured to:
designate at least one node of the plurality of nodes as a decoy node;
detect a portion of the digital traffic that requests access to the decoy node; and
based on the portion of the digital traffic requesting the access to the decoy node:
determine that a user identity requesting the access to the decoy node is a malicious user identity; and
initiate a tripwire functionality with respect to the malicious user identity.

15. The obfuscation system of claim 14, wherein to initiate the tripwire functionality with respect to the malicious user identity, the processing circuitry is configured to update the interactive UI identifying the malicious user identity.

16. The obfuscation system of claim 14, wherein to designate the at least one node as the decoy node, the processing circuitry is configured to:
determine that the at least one decoy node is dormant with respect to activity over the distributed computing platform; and
select the at least one node to be designated as the decoy node based on the at least one node being dormant with respect to the activity over the distributed computing platform.

17. The obfuscation system of claim 9, wherein the processing circuitry is further configured to receive, via the interactive UI, an indication of the selection.

18. The obfuscation system of claim 9, wherein the processing circuitry is further configured to:
monitor the digital traffic over the distributed computing platform; and
output, via the interactive UI, information describing the monitored digital traffic.

19. The obfuscation system of claim 9, further comprising an input device, wherein to receive the indication of the selection, the processing circuitry is configured to receive the indication of the selection via the input device and via the interactive UI.

20. A non-transitory computer-readable storage medium encoded with instructions that, when executed, cause processing circuitry of an obfuscation system to:
- initialize communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the obfuscation computing system serves as an intermediary between the controller node and the one or more compute nodes;
- output an interactive user interface (UI) providing a selection between at least a first privilege level and a second privilege level; and
- perform an obfuscation mechanism based on a privilege level, including:
  - based on the selection being associated with the first privilege level, perform a first obfuscation mechanism for the distributed computing platform to obfuscate digital traffic between a user computing system and the plurality of nodes, and
  - based on the selection being associated with the second privilege level, perform a second obfuscation mechanism for the distributed computing platform to obfuscate digital traffic between the user computing system and the plurality of nodes, and wherein performing the second obfuscation mechanism comprises performing obfuscating operations on unobfuscated information that is received from the user computing system and then sent as obfuscated information to the controller or the one or more compute nodes, and performing reciprocal operations on obfuscated response information that is received from the controller or the one or more compute nodes and then sent as obfuscated response information to the user computing system, wherein the first privilege level is associated with privileged users of the user computing system and the second privilege level is associated with unprivileged users of the user computing system.

* * * * *